(12) United States Patent
Sampsell

(10) Patent No.: US 9,965,782 B2
(45) Date of Patent: May 8, 2018

(54) METHOD, MEDIUM, AND SYSTEM FOR SELECTIVE DISCLOSURE OF INFORMATION FROM COMPETING BIDDERS

(75) Inventor: David Harrold Sampsell, Minneapolis, MN (US)

(73) Assignee: David Harrold Sampsell, Minneapolis, MN (US)

( * ) Notice: Subject to any disclaimer, the term of this patent is extended or adjusted under 35 U.S.C. 154(b) by 787 days.

(21) Appl. No.: 13/234,512

(22) Filed: Sep. 16, 2011

(65) Prior Publication Data

US 2012/0072299 A1     Mar. 22, 2012

Related U.S. Application Data

(60) Provisional application No. 61/383,573, filed on Sep. 16, 2010.

(51) Int. Cl.
G06Q 30/06 (2012.01)

(52) U.S. Cl.
CPC .................. *G06Q 30/0611* (2013.01)

(58) Field of Classification Search
USPC .............................. 705/26.1, 26.3, 26.4, 27.1
See application file for complete search history.

(56) References Cited

U.S. PATENT DOCUMENTS

| | | | |
|---|---|---|---|
| 6,647,373 B1 | 11/2003 | Carlton-Foss | |
| 7,558,745 B2 | 7/2009 | Cullen, III et al. | |
| 2001/0032170 A1* | 10/2001 | Sheth | G06Q 10/0631 705/37 |
| 2001/0051913 A1* | 12/2001 | Vashistha | G06Q 10/06 705/37 |
| 2005/0278640 A1* | 12/2005 | Jones | G06F 21/6227 715/741 |
| 2005/0289042 A1* | 12/2005 | Friesen | G06Q 40/04 705/37 |
| 2006/0041503 A1* | 2/2006 | Blair et al. | 705/37 |

(Continued)

FOREIGN PATENT DOCUMENTS

| | | |
|---|---|---|
| KR | 100808497 | 3/2008 |
| KR | 100972578 | 7/2010 |

OTHER PUBLICATIONS

Borle et al., "The Timing of Bid Placement and Extent of Multiple Bidding: An Empirical Investigation Using Ebay Online Auctions", "Statistical Science", 2006, pp. 1-12, vol. 21, No. 2,194-205, Publisher: Institute of Mathematical Statistics (Year: 2006).*

(Continued)

*Primary Examiner* — Matthew E Zimmerman
(74) *Attorney, Agent, or Firm* — Fogg & Powers LLC

(57) ABSTRACT

One exemplary embodiment is directed to a method (and corresponding system) for managing a request-for-proposal (RFP). The method comprises receiving, at a website, information about the RFP from a customer for the RFP and receiving, at the website, proposals responsive to the RFP from a set of bidders. If requested by the customer, disclosing to each of the bidders a detailed comparative metric relating to the proposal for each of the other bidders. The detailed comparative metric comprises a comparative metric other than a total project cost for the respective proposal.

16 Claims, 35 Drawing Sheets

(56) References Cited

U.S. PATENT DOCUMENTS

2009/0299906 A1* 12/2009 Moshal .................. G06Q 30/08
705/80

OTHER PUBLICATIONS

International Preliminary Examining Authority, "International Preliminary Report on Patentability", from Foreign Counterpart of U.S. Appl. No. 13/234,512, dated Mar. 28, 2013, pp. 1-6, Published in: WO.
International Searching Authority, "International Search Report and Written Opinion", dated Jul. 27, 2012, dated Aug. 3, 2012, Published in: WO.
Borle et al., "The Timing of Bid Placement and Extent of Multiple Bidding: An Empirical Investigation Using Ebay Online Auctions", "Statistical Science", 2006, pp. 1-12, vol. 21, No. 2,194-205, Publisher: Institute of Mathmatical Statistics.
Lucking-Reiley et al., "Pennies From Ebay: The Determinants of Price in Online Auctions", "Working Paper No. 00-W03", Nov. 1999, pp. 1-25, Publisher: Department of Economics, Vanderbilt University.

* cited by examiner

| Transaction-Merger/Acquistion/Divestiture | Edit Matter Name |

Matter Overview

*In the space provided below please provide a factual overview of this matter. We suggest you provide the service providers with significant background about the matter and the objectives your company desires to achieve. You need not include information about how you believe the matter should be staffed as this is handled in the "Staffing" tab. Similarly, you need not include information about your expectations regarding billing methods or overall budget as this is handled in the "Bidding Parameters" tab. You may attach relevant documents (e.g. a term sheet, a presentation, a case summary, etc.) if you desire.*

Matter Description

| Bold | *Italic* | Underline | Link | Bullets | Numbers |

324

326

Save Changes

🔗 Attach Document(s)
328

Save

Roster of Preferred Staff Members — 334

Resource 1  *Hint - Change name so it's meaningful for you.*

Experience Level | Choose one... ▼

Jurisdictions
United States
☐ Alaska
☐ Arizona
☐ Arkansas
☐ California
☐ Colorado

Areas of Expertise
Corporate
☐ Anti Bribery / Anti-Corruption
☐ Anti-Trust / Competition
☐ Bankruptcy / Corporate Restructuring
☐ Commercial Transactions
☐ Corporate Governance / Entity

Associated Phases
Merger / Acquisition / Divestiture
☐ Due Dilligence/Fact Gathering
☐ Structure, Strategy and Analysis
☐ Initial Preparation of Documentation
☐ Negotiation of, and Revision and Responses to Documentation
☐ Completion or Closing and Related Implementation Tasks

[ Save ] [ Cancel ]

⊕ Add New Resource — 340

— 342 (pointing to Resource 1 area)
— 338
— 344 [ Save & Continue ]

*You may use this tool to create a proposed roster of attorneys and paralegals you would like to work on your project. For each staff member you can specify their title, level of experience, practice jurisdiction, areas of expertise and the phases of your project on which you'd expect the staff member to work. Law firms responding to your RFP will then seek to deploy staff members who meet your proposed roster from their own ranks or from local counsel they may retain to meet your needs.*

BanyanRFP™

| Projects | People & Permissions |

392 | Project Name | Work Scope | Staffing | Questions | Bid Parameters | Invitations | Dash Views | Review & Launch Project X Your questions has been saved successfully.

Selection Criteria — 360

*You may wish to provide information about the criteria you will use to select your preferred respondent to work on this project. If so, below please include that information. For a tutorial on commonly used criteria, click here.*

Preferred Fee Methods — 362

*You may wish to provide information about fee methods you would prefer respondents to propose and/or what factors associated with fee proposals are most important to you (e.g. certainty of cost, risk sharing in the outcome of the matter relative to cost, etc.). If so, below please include that information. For a tutorial on fee methods, click here.*

Currency Issues

Primary Response Currency: [United States Dollars ▼] — 367

Currency Conversion Rates — 366

| From | To | Rate |
|---|---|---|
| United States Dollars ▼ | United States Dollars ▼ | |

⊕ Add Conversion Rate for Another Currency

*Please specify the currency in which you will review fee proposals (the "Response Currency").*

*Read more>*

Timeline Parameters

⊕ Add Bidding Round — 370

368

*Please specify how rounds of bidding you expect to be included in your proposal process and the timeline for the start and end of each round. You may edit these elections at any time, even after your project has been launched.*

374

Additional Parameters

*Please provide any additional parameters you believe will assist law firms in submitting a meaningful proposal for your project. For instance, if certain factors will weigh heavily in your decision on whom to engage, you may want to notify the law firms you invite to submit proposals. For a tutorial of parameters commonly cited, please click here.*

[Save & Continue] — 376

| Currency Issues | | | |
|---|---|---|---|
| Primary Response Currency: | United States Dollars ▼ | | 367 |
| Currency Conversion Rates | | 366 | |
| From | To | Rate | |
| United States Dollars ▼ | United States Dollars ▼ | | |
| ⊕ Add Conversion Rate for Another Currency | | | 368 |

*Please specify the currency in which you will review fee proposals (the "Response Currency").*

📖 Read more>

Timeline Parameters

Round 1

Start Date: 09/11/2011  Start Time: 9:00 ▼  AM PM
End Date: 10/11/2011  Start Time: 5:00 ▼  AM PM          372

⊕ Add Bidding Round

370

Additional Parameters                    374

[text box]

*Please specify how rounds of bidding you expect to be included in your proposal process and the timeline for the start and end of each round. You may edit these elections at any time, even after your project has been launched.*

*Please provide any additional parameters you believe will assist law firms in submitting a meaningful proposal for your project. For instance, if certain factors will weigh heavily in your decision on whom to engage, you may want to notify the law firms you invite to submit proposals. For a tutorial of parameters commonly cited, please click here.*

[ Save & Continue ]

BanyanRFP™

| Projects | People & Permissions |

Project X  — 392

| Project Name | Work Scope | Staffing | Questions | Bid Parameters | Invitations | Dash Views | Review & Launch |

Your invites have been saved successfully.

Dash Views — 384

| Default Metrics | Your Default View | Respondent Default View |
|---|---|---|
| Total Hours | ☐ | ☐ |
| Total Fees | ☐ | ☐ |
| Total Expenses | ☐ | ☐ |
| Total Fees & Expenses | ☐ | ☐ |
| Total Discount | ☐ | ☐ |
| Total Percentage Discount | ☐ | ☐ |
| Blended Hourly Billing Rate | ☐ | ☐ |
| Effective Blended Hourly Billing Rate | ☐ | ☐ |
| Display Q & A (Email Q & A re: RFP) | ☐ | ☐ |
| Updating the Respondent View in Real Time* | ☑ | |

*Note that the respondent view will not update unless you choose to update it.

*Please select your dashboard reporting view options for this RFP. You can always change this later. (You'll be able to select a variety of comparative metrics within the dashboard later.) RFP respondents, by default, will be able to anonymously see their metrics alongside their competitors. You may choose to disable this feature.*

[ Save & Continue ] — 386

BanyanRFP™

| Proposals |
|---|

RFPs are waiting your response.

| Status | Title | Responses | Print | Withdraw |
|---|---|---|---|---|
| N/A | ArcStone - Initial Test<br>Bidding Ends 10/01/2011 for Round 1 | 0 Responses | Print RFP | Withdraw |
| N/A | ArcStone - Another Test<br>Bidding Ends 10/01/2011 for Round 1 | 0 Responses | Print RFP | Withdraw |
| N/A | ArcStone - Project Blank | 0 Responses | Print RFP | Withdraw |
| N/A | ArcStone - Project Messi<br>Bidding Ends 10/01/2011 for Round 1 | 0 Responses | Print RFP | Withdraw |

*FIG. 4A*

Project Messi

476

| | Review RFP | Resources | Financial Proposal | Questions | Review & Submit |

Staffing Expectations

| Label | Experience Level | Jurisdictions | Areas of Expertise | Associated Phases | Bio? |
|---|---|---|---|---|---|
| Resource 1 | Attorney 10-15 Years | United States - Minnesota | Corporate - Mergers / Acquisitions / Divestitures | Stock Acquisition - Structure, Strategy and Analysis<br>Stock Acquisition - Negotiation of, and Revision and Responses to Documentation<br>Stock Acquisition - Initial Preparation of Documentation | No |
| Resource 2 | Attorney 10-15 Years | United States - Minnesota | Corporate - Mergers / Acquisitions / Divestitures | Stock Acquisition - Due Diligence/Fact Gathering<br>Stock Acquisition - Structure, Strategy and Analysis<br>Stock Acquisition - Initial Preparation of Documentation<br>Stock Acquisition - Negotiation of, and Revision and Responses to Documentation<br>Stock Acquisition - Completion or Closing and Related Implementation Tasks | No |

Your Resources

| Name | Affiliation | Experience Level | Jurisdictions | Areas of Expertise | Std. Rate |
|---|---|---|---|---|---|
| Joe Junior | Doe & Smith | Attorney 3-6 Years | United States-Minnesota | Corporate - Mergers / Acquisitions / Divestitures | $100 |
| Mary Mid | Doe & Smith | Attorney 6-10 Years | United States-Minnesota | Corporate - Mergers / Acquisitions / Divestitures | $200 |
| Sam Senior | Doe & Smith | Attorney 10-15 Years | United States-Minnesota | Corporate - Mergers / Acquisitions / Divestitures | $300 |
| Pam Doe | Doe & Smith | Attorney 15+ Years | United States-Minnesota | Corporate - Mergers / Acquisitions / Divestitures | $400 |

⊕ Add New Question — 418

410

416

Save & Continue — 422

FIG. 4F

BanyanRFP™

Project Messi — 476

| | Review RFP | Proposals | Resources | Financial Proposal | Questions | Review & Submit | BanyanRFP™ |

424

| Matters | | | | | 426 |
|---|---|---|---|---|---|
| Stock Acquisition | Std. Rate | Hours | Rate Method | Proposed Rate | Total |
| Due Diligence/Fact Gathering | | | 428 | | |
| ⊕ Add Resource — 432 | Add/Edit Notes | | | | |
| Totals This Phase: | | 0 | | | $0.00 |
| Structure, Strategy and Analysis | | | 428 | | |
| ⊕ Add Resource — 432 | Add/Edit Notes | | | | |
| Totals This Phase: | | 0 | | | $0.00 |
| Initial Preparation of Documentation | | | 428 | | |
| ⊕ Add Resource — 432 | Add/Edit Notes | | | | |
| Totals This Phase: | | 0 | | | $0.00 |
| Negotiation of, and Revision and Responses to Documentation | | | 428 | | |
| ⊕ Add Resource — 432 | Add/Edit Notes | | | | |
| Totals This Phase: | | 0 | | | $0.00 |

FIG. 46

BanyanRFP™ 424

Project Messi 476

| Review RFP | Proposals | Resources | Financial Proposal | Questions | Review & Submit |

Matters

| | Std. Rate | Hours | Rate Method | Proposed Rate | Total |
|---|---|---|---|---|---|
| Stock Acquisition | | | | | |
| Due Diligence/Fact Gathering | | | | | |
| Joe Johnson-Attorney 3-6 Years ▶ 434 | $350.00 | 0 ▲438 | Standard Hourly ▶ 436 | $350.00 ←428 | $0.00 ↙440 |
| ⊕ Add Resource 432 | Add/Edit Notes | | | | |
| Totals This Phase: | | 0 | | | $0.00 |
| Structure, Strategy and Analysis | | | | | |
| ⊕ Add Resource 432 | Add/Edit Notes | | | ←428 | |
| Totals This Phase: | | 0 | | | $0.00 |
| Initial Preparation of Documentation | | | | | |
| ⊕ Add Resource 432 | Add/Edit Notes | | | ←428 | |
| Totals This Phase: | | 0 | | | $0.00 |
| Negotiation of, and Revisions and Responses to Documentation | | | | ←428 | |
| ⊕ Add Resource 432 | | | | | |

METHOD, MEDIUM, AND SYSTEM FOR SELECTIVE DISCLOSURE OF INFORMATION FROM COMPETING BIDDERS

CROSS-REFERENCE TO RELATED APPLICATIONS

This application claims the benefit of U.S. Provisional Patent Application Ser. No. 61/383,573, filed Sep. 16, 2010, which is incorporated herein by reference.

BACKGROUND

Corporations and other entities typically are sophisticated consumers of legal services. Such entities frequently use request-for-proposal (RFP) processes to obtain legal services. These processes generally are managed manually. Typically the customer will send out a set of instructions to service providers. The set of instructions indicate how the service providers should respond to the RFP. A service provider can then submit written responses to the RFP that include information on how the service provider would perform the requested work and the rates it would charge for such work. The customer then typically compares the submitted proposals manually. This manual process of submission and comparison suffers from a number of inefficiencies. For example, legal service providers who submit proposals in response to an RFP may not format their proposals or otherwise provide the fee proposal and other information in the manner the customer might expect. In turn, if service providers do not provide information in a consistent format, the comparison of the submitted proposals is not easily facilitated. The entities that conduct these RFP processes often then spend significant time following-up with the legal service providers to obtain correct information and/or to translate manually the provided information from the proposals into a consistent format.

Further, because proposals are submitted separately, calculating detailed comparisons of various metrics between the fee data that is submitted can be cumbersome and time consuming. In addition, there typically is no efficient and centralized means to provide written answers to questions service providers may have about an RFP. Instead, such questions typically are communicated to the customer on an ad hoc basis. For each such question, the customer will have to decide whether the answer to the question should be communicated to only the service provider asking the question or to all of the service providers and then individually provide the answer to each such service provider.

Moreover, it is often the case that receiving proposals that are submitted in response to an RFP is only the first step in the RFP process. After receiving the proposals from the legal service providers, many customers for legal services go back to one or more of the legal service providers in order to let them know how one or more aspects of their respective proposals compared against other proposals. This is done in an effort to elicit a more competitive proposal from that provider. Typically, however, the service provider does not have any direct means to see how key metrics of its proposal compare against corresponding key metrics of competing proposals. The service provider, therefore, is only prompted to update its proposal based upon the limited information that is typically provided to the service provider by the customer. Because the service providers likely only have limited information about changes their competitors are willing to make to their proposals, each service provider often has limited reason to update its proposal.

Manually managing such an RFP process is typically time consuming. Although there are automated tools for managing an RFP process, such tools typically are not well-adapted for use by corporations and other entities in connection with complex and/or sophisticated legal projects. For example, such RFP tools typically assume that all potential bidders are essentially the same and typically are configured to award the project to the bidder that has proposed the lowest price. Such a simplistic decision calculus often is not appropriate for complex and sophisticated legal projects.

SUMMARY

One exemplary embodiment is directed to a method (and corresponding system) for managing a request-for-proposal (RFP). The method comprises receiving, at a website, information about the RFP from a customer for the RFP and receiving, at the website, proposals responsive to the RFP from a set of bidders. If requested by the customer, disclosing to each of the bidders a detailed comparative metric relating to the proposal for each of the other bidders. The detailed comparative metric comprises a comparative metric other than a total project cost for the respective proposal.

Another exemplary embodiment is directed to a method (and corresponding system) for receiving, at a website from a bidder, a project proposal for a request-for-proposal (RFP). The method comprises displaying, via the website, a financial proposal page by which the bidder is able to enter information for a set of line items for a financial proposal for the project proposal. Each line item is associated with a resource, a standard billing rate, a time estimate, a billing method entity, and a cost estimate. Each billing method entity is associated with a billing method that is used for calculating the respective cost estimate for each line item associated with that billing method entity. The website is configured to enable the bidder to specify multiple billing method entities for the financial proposal using the financial proposal page. The method further comprises receiving, from the bidder at the financial proposal page of the website, the information for the set of line items for the financial proposal. The method further comprises receiving, from the bidder at the financial proposal page of the website, a change to an attribute associated with a first billing method entity specified for at least one of the line items. The method further comprises, after receiving the change to the attribute, updating the financial proposal page so that the cost estimate for each line item associated with the first billing method entity is automatically updated to reflect the change to the attribute.

Another exemplary embodiment is directed to a method (and corresponding system) for managing a proposal process for a request-for-proposal (RFP). The method comprising receiving, at a website, current proposals responsive to the RFP from a set of bidders and receiving, at the website, updates to the current proposals provided by the bidders. The method further comprises displaying, via the website, a page via which the customer is able to selectively cause the website to: disclose to each of the bidders a comparative metric relating to the current proposal for each of the other bidders during one or more portions of the proposal process, and not disclose to each of the bidders the comparative metric relating to the current proposal for each of the other bidders during one or more other portions of the proposal process.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
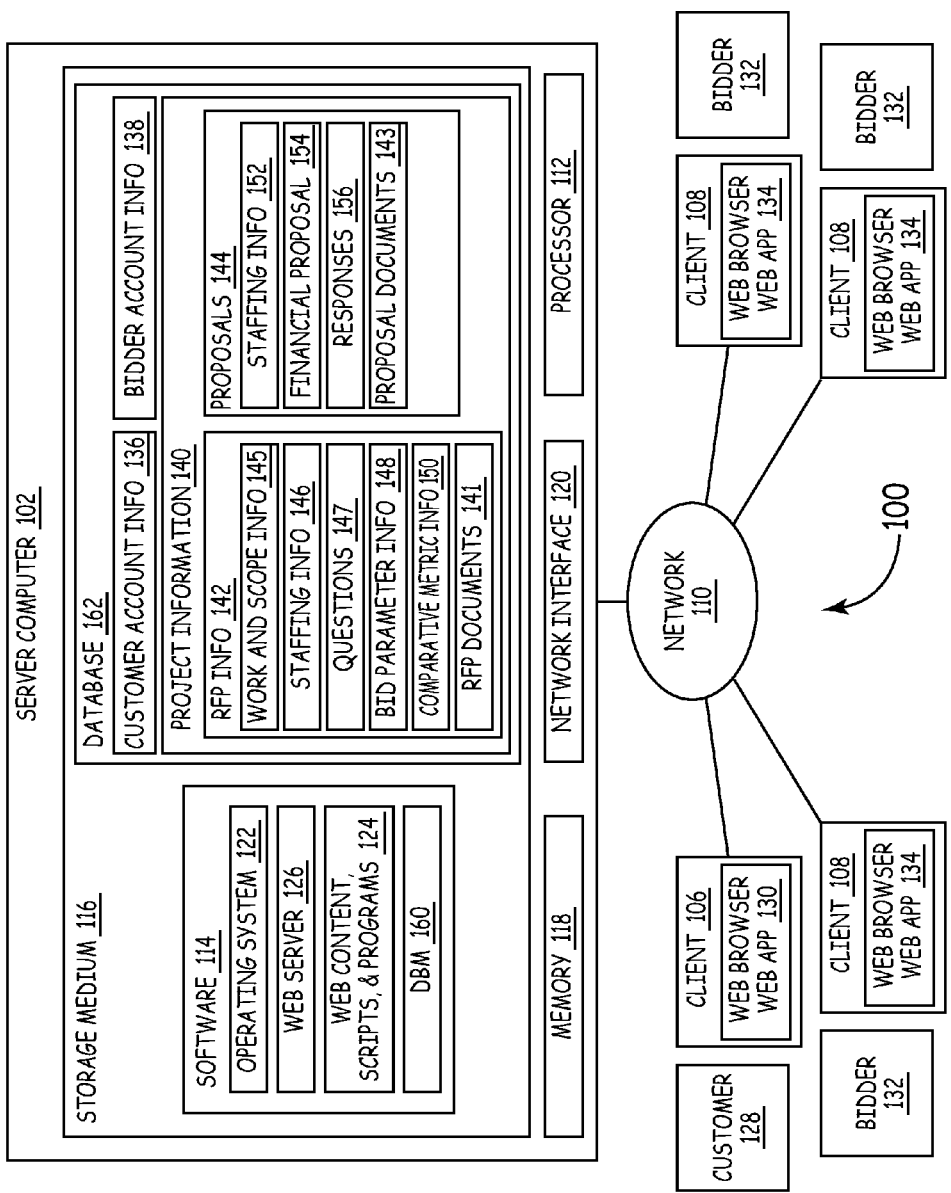
FIG. 1 is a block diagram of an exemplary embodiment of a system for managing a request-for-proposal process.

FIG. 1 is a block diagram of an exemplary embodiment of a system 100 for managing a request-for-proposal (RFP) process. The exemplary embodiment of the system 100 shown in FIG. 1 is described here as being configured to manage an RFP for legal services, though the system 100 can be used for other types of RFPs relating to the provision of services (especially professional services) and is not intended to be limited to only legal services.

In the exemplary embodiment shown in FIG. 1, a server computer 102 is configured to host a website 104 that is used to manage the RFP process. This website 104 is also referred to here as the "RFP website" 104. In the example shown in FIG. 1, a single server computer 102 is shown for ease of illustration, though it is to be understood that the RFP website 104 can be hosted by multiple server computers 102 using conventional web-site hosting techniques. For example, where multiple server computers 102 are used, all of the server computers 102 can be configured to execute the same functions or can be configured to execute different functions.

Client devices 106 and 108 access the website 104 hosted by the server computer 102 over a suitable communication network 110 (such as the Internet or a virtual private network (VPN) implemented on top of a public network such as the Internet).

In the exemplary embodiment shown in FIG. 1, the server computer 102 comprises one or more programmable processors 112 for executing software 114. The software 114 comprises program instructions that are stored (or otherwise embodied) on or in an appropriate non-transitory storage medium or media 116 (such as flash or other non-volatile memory, magnetic disc drives, and/or optical disc drives). At least a portion of the program instructions are read from the storage medium 116 by the programmable processor 112 for execution thereby. The storage medium 116 on or in which the program instructions are embodied is also referred to here as a "program product." Although the storage media 116 is shown in FIG. 1 as being included in, and local to, the respective server computer 102, it is to be understood that remote storage media (for example, storage media that is accessible over the network 110) and/or removable media can also be used. Each server computer 102 also includes memory 118 for storing the program instructions (and any related data) during execution by the programmable processor 112. Memory 118 comprises, in one implementation, any suitable form of random access memory (RAM) now known or later developed, such as dynamic random access memory (DRAM). In other embodiments, other types of memory are used.

The server computer 102 also includes an appropriate network interface 120 to communicatively couple the server computer 102 (and the components thereof) to the communication network 110.

The various components of the server computer 102 are communicatively coupled to one another as needed using appropriate interfaces and interconnects, for example, buses, ports, and the like.

In the exemplary embodiment shown in FIG. 1, the software 114 executed by the server computer 102 comprises an operating system 122 to control the operation of the other software 114, website content, scripts, and/or programs 124 that implement the RFP website 104, a web server 126 that delivers the RFP website content, scripts, and/or programs 124 to the client devices 106 and 108 that access the RFP website 104, and a database manager (DBM) 160 that manages a database 162.

As used herein, a "customer" 128 refers to the entity or person that is creating a particular RFP. A customer 128 uses a client device 106 (such as a computer, smartphone, tablet device (such as an iPad tablet) or personal digital assistant (PDA) device) executing a web browser (or a "web app") 130 to access and interact with the RFP website 104. As used herein, a "bidder" 132 refers to an entity or person that has been invited by the customer 128 to submit a proposal in response to an RFP. Each bidder 132 uses a respective client device 108 (such as a computer, smartphone, tablet device (such as an iPad tablet) or personal digital assistant (PDA) device) executing a web browser (or a web app) 134 to access and interact with the RFP website 104.

In the exemplary embodiment shown in FIG. 1, the database 162 is also stored on the storage medium 116. Again, as noted above, although the storage media 116 is shown in FIG. 1 as being included in, and local to, the respective server computer 102, it is to be understood that remote storage media (for example, storage media that is accessible over the network 110) and/or removable media can also be used. Also, the database 162 need not be entirely stored on the same storage medium 116 as the software 114.

In the exemplary embodiment shown in FIG. 1, the database 162 comprises a centralized database in which customer account information 136, bidder account information 138, and project information 140 is stored for use by the RFP website 104. In the exemplary embodiment shown in FIG. 1, the project information 140 includes, for each project that a customer 128 has created, information 142 about the RFP the customer 128 has prepared for that project (also referred to here as "RFP information" 142) and information about any proposals that have been submitted in response to that RFP (also referred to here as "proposal information" 144 or "proposals" 144).

As described in more detail below, the RFP information 142 for each project includes work scope information 145 that specifies the scope and structure of the work to be performed and staffing information 146 that describes the customer's expectations regarding how the project will be staffed and, possibly, a roster of preferred staff members. The RFP information 142 for each project also includes question information 147 (also referred to here simply as "questions" 147) that specifies questions that the customer 128 would like each bidder 138 to answer in that bidder's proposal 144 and bid parameter information 148 that specifies various parameters related to the project. The RFP information 142 for each project further includes bidder information 149 that specifies information about the set of bidders 132 the customer 128 wishes to invite to bid on the project and comparative metric information 150 that specifies comparative metrics that will be displayed in summary form (for example, in a "dashboard") for the customer 128 to view and for the bidders 132 to view. As used herein, "comparative metric" refers to a quantifiable component of a proposal and "detailed comparative metric" refers to a comparative metric other than total project cost.

The RFP information 142 described above is used by the RFP website 104 to generate a RFP document 141. In this exemplary embodiment, the RFP document 141 is formatted by the RFP website 104 to present the RFP information 142 in a detailed, human-readable form. For example, in one implementation of this exemplary embodiment, the RFP document 141 is generated as a Portable Document Format (PDF) document (though the RFP document 141 can be generated in other document formats).

As described in more detail below, each proposal 144 that is submitted by a bidder 132 for a given project includes staffing information 152 that specifies information about the people that the bidder 132 is proposing to have work on the project. Each proposal 144 also includes a financial proposal 154. Each financial proposal 154 is created by having the bidder 132 populate a financial proposal page (described below) that is displayed via the website 104. Each bidder 132 populates the financial proposal page with appropriate information about the financial aspects of that bidder's proposal 144. Each proposal 144 also includes responses 156 to any questions 147 that the customer 128 has asked each bidder 132 to answer.

The proposal information 144 described above is used by the RFP website 104 to generate a proposal document 143. In this exemplary embodiment, the proposal document 143 is formatted by the RFP website 104 to present the proposal information 144 in a detailed, human-readable form. For example, in one implementation of this exemplary embodiment, the proposal document 143 is generated as a PDF document (though the proposal document 143 can be generated in other document formats).

In general, the RFP website 104 is used by a customer 128 to manage an RFP process for a project. In the particular exemplary embodiment described here in connection with FIGS. 2-4, each RFP process typically includes at least two bidding rounds (although it is possible for the customer 128 to elect to conduct a RFP process with a single bidding round). Each round has a respective deadline (specified by the customer 128 in the bid parameter information 148). In the first round of the RFP process (also referred to herein as the "initial round"), each of the bidders 132 has the opportunity to submit an initial proposal 144 for the project until the deadline for the initial round has passed. Then, after the initial round deadline has passed, one (and potentially thereafter more) competitive bidding rounds of the RFP process begins.

If requested by the customer 128, the bidders 132 are permitted to view selected comparative metrics relating to the other bidders' proposals 144 during at least a portion of the RFP process. Typically, when one or more competitive bidding rounds are used in the RFP process, the customer 128 will permit the bidders 132 to view selected comparative metrics relating to other bidders' proposals 144 after the initial round is over. However, the customer 128 may wish to not permit the bidders 132 to view selected comparative metrics relating to other bidders' proposals 144 at some point in the RFP process. For example, the customer 128 may wish to not permit the bidders 132 to view the selected comparative metrics for the other bidders' final proposals 144 for relationship management purposes. For instance, the customer 128 may ultimately decide not to select the proposal having the lowest total project cost and may wish to avoid having to justify the customer's decision to those bidders 132 that submitted proposals 144 having lower total project costs than the selected proposal 144. Also, the customer 128 may believe that not permitting the bidders 132 to view the selected comparative metrics for the other bidders' proposals 144 in the final bidding round may result in the bidders 132 providing more competitive proposals 144.

The selected comparative metrics relating to the other bidders' proposals 144 can include both the total project cost as well as detailed comparative metrics relating to the other bidders' proposals 144. Also, in each competitive bidding round, each of the bidders 132 is allowed to update its respective proposal 144 until the deadline for that competitive bidding round has passed. For example, after viewing comparative metrics relating to the other bidders' 132 proposals 144, a bidder 132 can update its proposal 144. However, the other bidders 132 would also have a chance to view updated comparative metrics relating to that bidder's updated proposal 134 and update their own proposals 144. That is, the bidders 132 have a chance to repeatedly update their proposals 144 during one or more competitive bidding rounds in which they can view comparative metrics for the other bidders' proposals 144.

Moreover, the customer 128 may decide after the initial round or one of the competitive bidding rounds is over that one or more of the bidders 132 will not be permitted to continue to participate in the RFP process.

When the final bidding round is over, the customer 128 is free to select any or none of the submitted proposals 144.

Figure 2A:
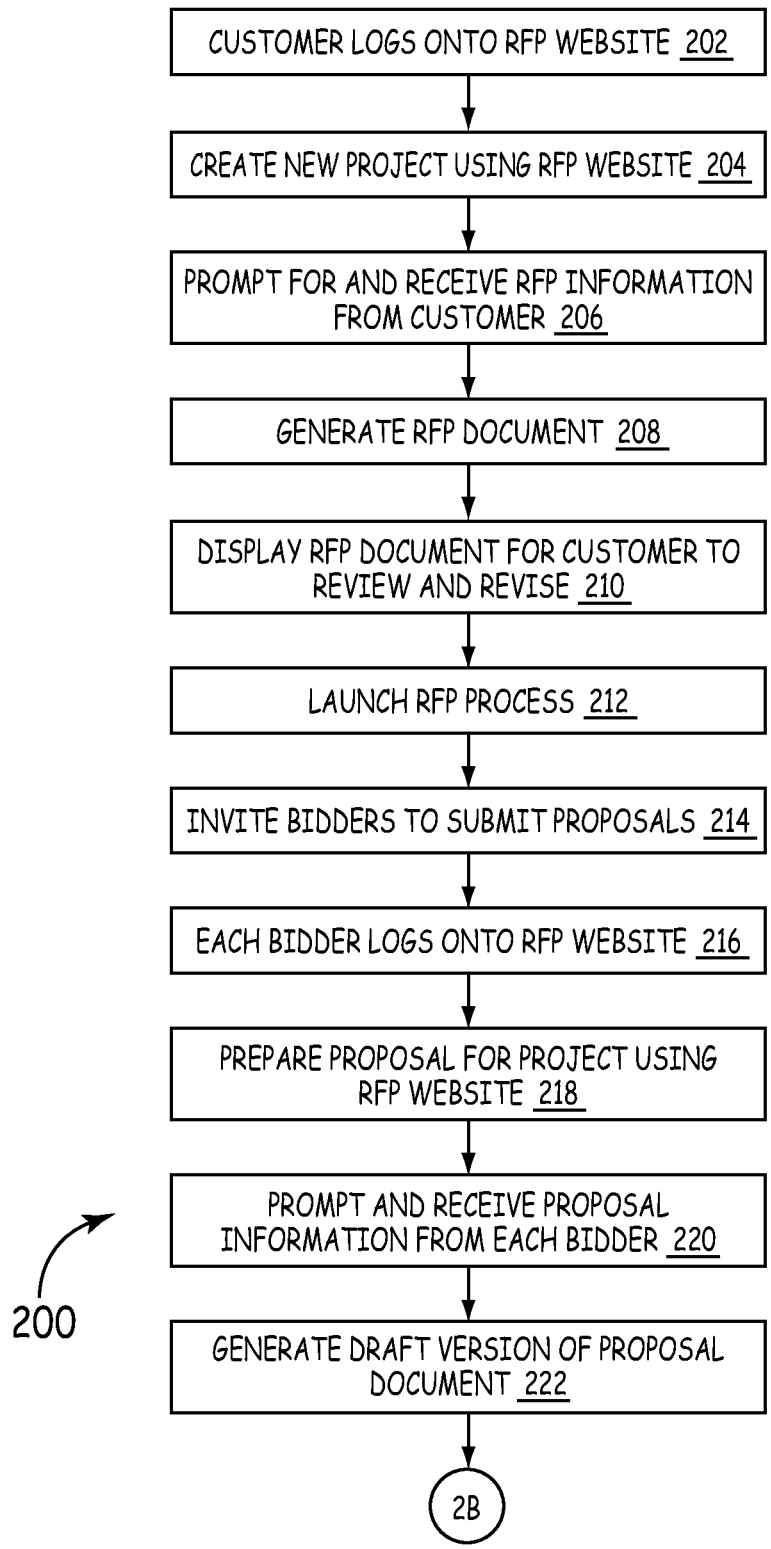
FIGS. 2A-2B are flow diagrams of one exemplary embodiment a method of managing a request-for-proposal.
Figure 2B:
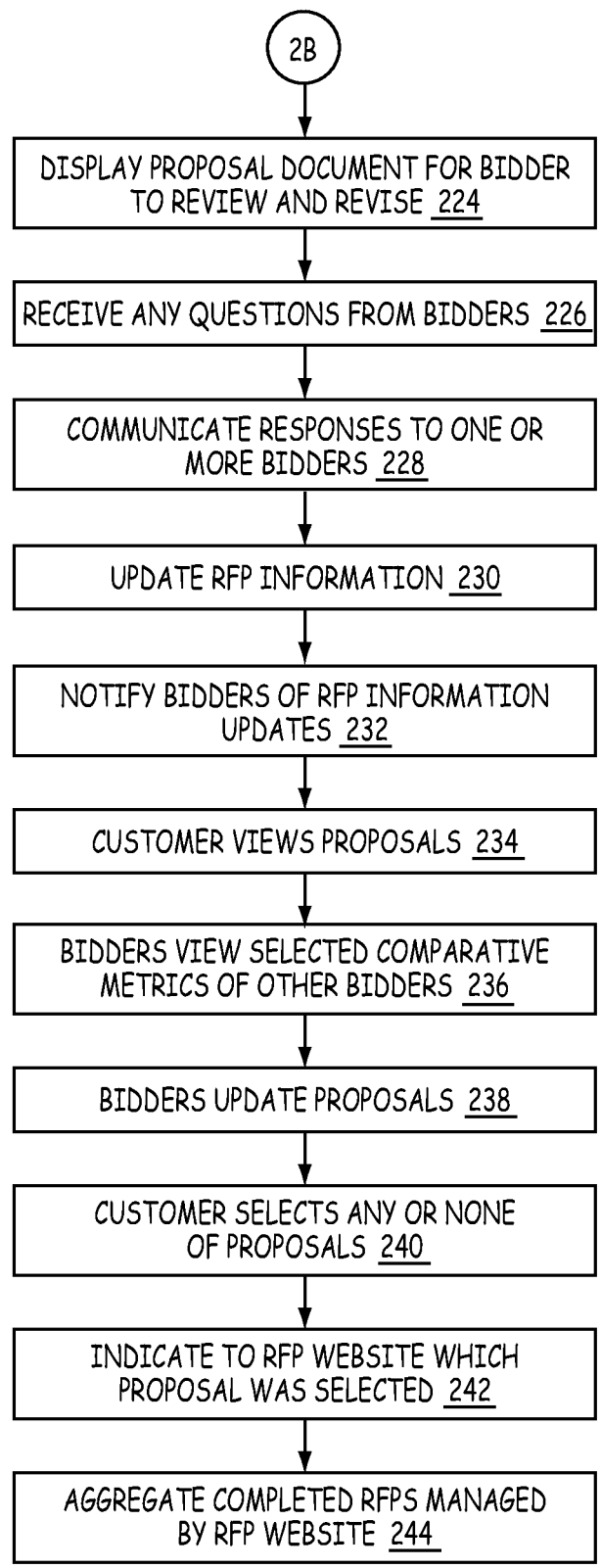

FIGS. 2A-2B are flow diagrams of one exemplary embodiment a method 200 of managing a request-for-proposal (RFP). The exemplary embodiment of method 200 is described here as being implemented in the system 100 of FIG. 1 (though other embodiments can be implemented in other ways). In this exemplary embodiment, the processing associated with method 200 is implemented by the RFP website 104 and the various web browsers or web apps 130 and 134 used by the customer 128 and bidders 132 to interact with the RFP website 104.

When a customer 128 wishes to use the RFP website 104 to manage an RFP process for a particular project, the customer 128 accesses the RFP website 104. The first time a particular customer 128 uses the RFP website 104 to manage an RFP, the customer 128 must establish an account with the RFP website 104 (which involves the customer 128 providing information such as an email address or other username and a password to log on to the RFP website 104 and information about the customer (for example, company name, address, etc.) and, in some implementations, payment information (for example, a credit card number to charge or an address to send an invoice to)). Thereafter, the customer 128 logs onto the RFP website 104 using the username and password that was established for that customer 128 (block 202 of FIG. 2A).

After logging onto the RFP website 104, the customer 128 clicks or otherwise actuates a user interface element displayed by the RFP website 104 (for example, a link, button, or menu item) that is associated with creating a new project (block 204). In response to this happening, the RFP website 104 creates the new project and prompts the customer 128 for, and receives therefrom, RFP information 142 for the project that will be the subject of the RFP (block 206). As described in more detail below in connection with FIGS. 3A-3Q, the RFP website 104 guides the customer 128 through entering work scope information 145, staffing information 146, questions 147, bid parameter information 148, bidder information 149, and comparative metric information 150 for the RFP.

Once the customer 128 has entered the RFP information 142 for the project, the RFP website 104 generates a draft version of the RFP document 141 for that project (block 208). The RFP website 104 is configured to enable the customer 128 to review the RFP document 141 and then use the RFP website 104 to change the RFP information 142 and generate an updated version of the RFP document 141 (block 210). The customer 128 is able to repeat these steps until the customer 128 is satisfied with the RFP document 141 and the RFP information 142.

When the customer 128 has finished reviewing the RFP document 141 and revising the RFP information 142 for the project, the customer 128 uses the RFP website 104 to start or "launch" the RFP process (block 212). More specifically, the customer 128 clicks or otherwise actuates a user interface element displayed by the RFP website 104 (for example, a link, button, or menu item) that is associated with launching the RFP process for that project.

After the customer 128 has launched the RFP process, the RFP website 104 invites the identified bidders 132 to submit proposals 144 in response to the RFP for this project (block 214). In one implementation, a contact person for each bidder 132 is sent an email inviting that bidder 132 to submit a proposal for the project. The bidders 132 can be invited in other ways (for example, by Short Message Service (SMS) text message, fax, mail, and/or telephone). The invitation sent to each bidder 132 explains that the bidder 132 is being invited to submit a proposal for the customer's project and instructions for accessing the RFP website 104 and the RFP.

When a bidder 132 wishes to enter a proposal for that project in response to the RFP, that bidder 132 can access the RFP website 104 to view information about the project and the RFP (for example, by clicking on a link included in the invitation email). The first time a particular bidder 132 uses the RFP website 104, the bidder 132 must establish an account with the RFP website 104 (which involves the bidder 132 providing an email address or other username and a password to log on to the RFP website 104 and information about the bidder 132 (for example, firm name, address, etc.)). Thereafter, the bidder 132 logs onto the RFP website 104 using the username and password that was established for that bidder 132 (block 216).

After logging onto the RFP website 104, the bidder 132 clicks or otherwise actuates a user interface element displayed by the RFP website 104 (for example, a link, button, or menu item) that is associated with preparing a proposal for the project (block 218). For example, in one implementation, after a bidder 132 logs onto the RFP website 104, the bidder 132 is presented with a list of projects for which that bidder 132 has been invited to submit proposals 144 (including any current proposals 144 for RFPs that have not expired and any past proposals 144 for RFPs that have expired). The bidder 132 can then select the project identified in the invitation.

Then, the RFP website 104 prompts the bidder 132 for, and receives therefrom, proposal information 144 about the project identified in the invitation (block 220). As described in more detail below in connection with FIGS. 4A-4O, in this exemplary embodiment, the RFP website 104 displays appropriate pages to prompt the user for, and receive from the user, information about the people the bidder is proposing to staff the project with (that is, the staffing information 152 for that bidder's proposal 144). Also, in this exemplary embodiment, the RFP website 104 displays appropriate pages to prompt the user for, and receive from the user, the bidder's financial proposal 154 for the project and the bidder's responses 156 to the customer's questions 147 for the project.

Once the bidder 132 has entered its proposal information 144 for the project, the RFP website 104 generates a draft version of the proposal document 143 for that project from the bidder's proposal information 144 (block 222). The RFP website 104 is configured to enable the bidder 132 to review the draft version of its proposal document 143 and to use the RFP website 104 to change its proposal information 144 (block 224). Also, in some implementations, the particular set of comparative metrics that the customer 128 has selected for its viewing and/or for the viewing of the other bidders 132 is also generated from the bidder's 132 current proposal information 144 and displayed for the bidder 132 to review the selected comparative metrics in the same summary or dashboard view that the customer 128 and/or the other bidders' 132 will view them in.

When the bidder 132 has finished reviewing its proposal document 143 (and, in some implementations, any selected comparative metrics) and revising its proposal information 144 for the project, the bidder 132 uses the RFP website 104 to submit its proposal 144 to the customer 128 for the current bidding round. More specifically, the bidder 132 clicks or otherwise actuates a user interface element displayed by the RFP website 104 (for example, a link, button, or menu item) that is associated with submitting the proposal 144 for the current bidding round.

Also, in this exemplary embodiment, the RFP website 104 provides a mechanism by which a bidder 132 is able to submit to the customer 128 any questions that the bidder 132 may have concerning the project or the RFP (block 226). The customer 128 can access the RFP website 104 in order to respond to any questions that have been submitted by the bidders 132, and the RFP website 104 communicates the response to one or more of the bidders 132 (block 228). For each response, the customer 128 is able to select whether the response should be sent to only the bidder 132 that asked the question or to all of the bidders 132. In one implementation, the bidder 132 is able to submit, and the customer 132 is able to respond to, questions during each round of the RFP process.

Also, in this exemplary embodiment, after launching the RFP process, the customer 128 is able to access the RFP website 104 to update at least some of the RFP information 142 for that project (block 230). When the customer 128 updates the RFP information 142, the RFP website 104 then notifies the bidders 132 of the updates to the RFP information 142 (block 232). The bidders 132 are permitted to access the RFP website 104 and update their proposals 144 in response to any updates to the RFP information 142 made by the customer 128.

In one implementation of this exemplary embodiment, the customer 128 is able to update only certain RFP information 142 once the RFP process has been launched. In such an implementation, the information that the customer 128 can edit includes, for example, bid parameters 148 such as the deadlines for one or more bidding rounds that have not been completed. In another implementation, the customer 128 is able to update all of RFP information 142 after the RFP process has been launched; however, changing certain RFP information 142 after the RFP process has been launched (for example, changing the work scope information 145 or the staffing information 146) may require the bidders 132 to significantly update their proposals 144 and the customer 128 may need to update the bid parameters 148 to extend the deadlines for some of the bidding rounds of the RFP process to give the bidders 132 more time to revise their proposals 144 to reflect the changes to the RFP information 142.

After the deadline for the initial round has passed, if selected by the customer 128 the RFP process enters the first of one or more competitive bidding rounds. During each competitive bidding round of the RFP process, the customer 128 is able to use the RFP website 104 to view the proposals 144 submitted by the bidders 132 (block 234). The RFP website 104 is configured to present the customer 128 information about the submitted proposals 144 in both a summary form (that is, by presenting a table that shows the total project coast as well any detailed comparative metrics that were selected by the customer 128) and in detail (that is, by permitting the customer 128 to view the proposal document 143 submitted by each bidder 132).

Also, in each competitive bidding round of the RFP process, if requested by the customer 128, all of the bidders 132 are permitted to use the RFP website 104 to view selected comparative metrics relating to the other bidders' proposals 144 (block 236). Such selected comparative metrics relating to the other bidders' proposals 144 can include both the total project cost as well as detailed comparative metrics relating to the other bidders' proposals 144. Each of the bidders 132 is allowed to use the RFP website 104 to update its proposal 144 until the deadline for the current competitive bidding round has passed (block 238).

For example, after viewing comparative metrics relating to the other bidders' proposals 144, a bidder 132 can use the RFP website 104 to update its proposal information 144, generate and review an updated proposal document 143, and further revise its proposal information 144 as described above in connection with blocks 222-224. As described above, when the bidder 132 has finished reviewing its proposal document 143 and revising its proposal information 144, the bidder 132 uses the RFP website 104 to submit its updated proposal 144 to the customer 128. After a bidder 132 submits its updated proposal 144, the RFP website 104 updates the comparative metrics for that bidder's updated proposal 144 to reflect the updates. The other bidders 132 would then have a chance to view the updated comparative metrics relating to the bidder's updated proposal 144 and update their own proposals 144. That is, the bidders 132 have a chance to repeatedly update their proposals 144 in response to viewing comparative metrics for the other bidders' initial and updated proposals 144.

As noted above, during each round of the RFP process, the bidders 132 can use the RFP website 104 to submit questions to the customer 128, and the customer 128 can use the RFP website 104 to respond to the submitted questions as described above in connection with blocks 226 and 228. Also, during each round of the RFP process, the customer 128 can use the RFP website 104 to update at least some of the RFP information 142 for the project, and the RFP website 104 notifies the bidders 132 of the updated RFP information 142 as described above in connection with block 230 and 232. When the deadline for the final round has passed, the customer 128 is free to select any or none of the submitted proposals 144 (block 240).

In the particular exemplary embodiment shown in FIGS. 2A-2B, for tracking purposes, the customer 128 can access the RFP website 104 and indicate to the RFP website 104 which, if any, of the proposals 144 has been selected by the customer 128 (block 242). By indicating which of the proposals 144 has been selected, the RFP website 104 will be able track information regarding successful and unsuccessful proposals 144.

In the particular exemplary embodiment shown in FIGS. 2A-2B, the RFP website 104 is configured to aggregate information about completed RFPs managed by the RFP website 104 (block 244). This information can be used to capture information about successful and unsuccessful proposals 144 as well as information about the related projects for which the proposals 144 were submitted. Such aggregation can happen across all the projects of a single customer 128 or bidder 132 or across other groups. Such aggregation can occur across larger groups that relate to the customer 128 or bidder 132 (such as aggregating across an entire corporation where the customer 128 or bidder 132 represents a single division of a large company or across an industry in which the customer 128 or bidder 132 competes) and/or across larger groups that relate to the project 128 (such as aggregating across all projects of a particular type). Also, such aggregation can occur across all the RFPs managed by the RFP website 104. This aggregated data can be used for many purposes (for example, the sale of such data to customers 128, bidders 132, advertisers, etc.)

In others embodiments of method 200, the processing associated with one or more of the blocks described above in connection with the FIG. 2 is not performed (for example, the processing associated with one or more of blocks 226-228, block 242, and block 244).

Figure 3A:
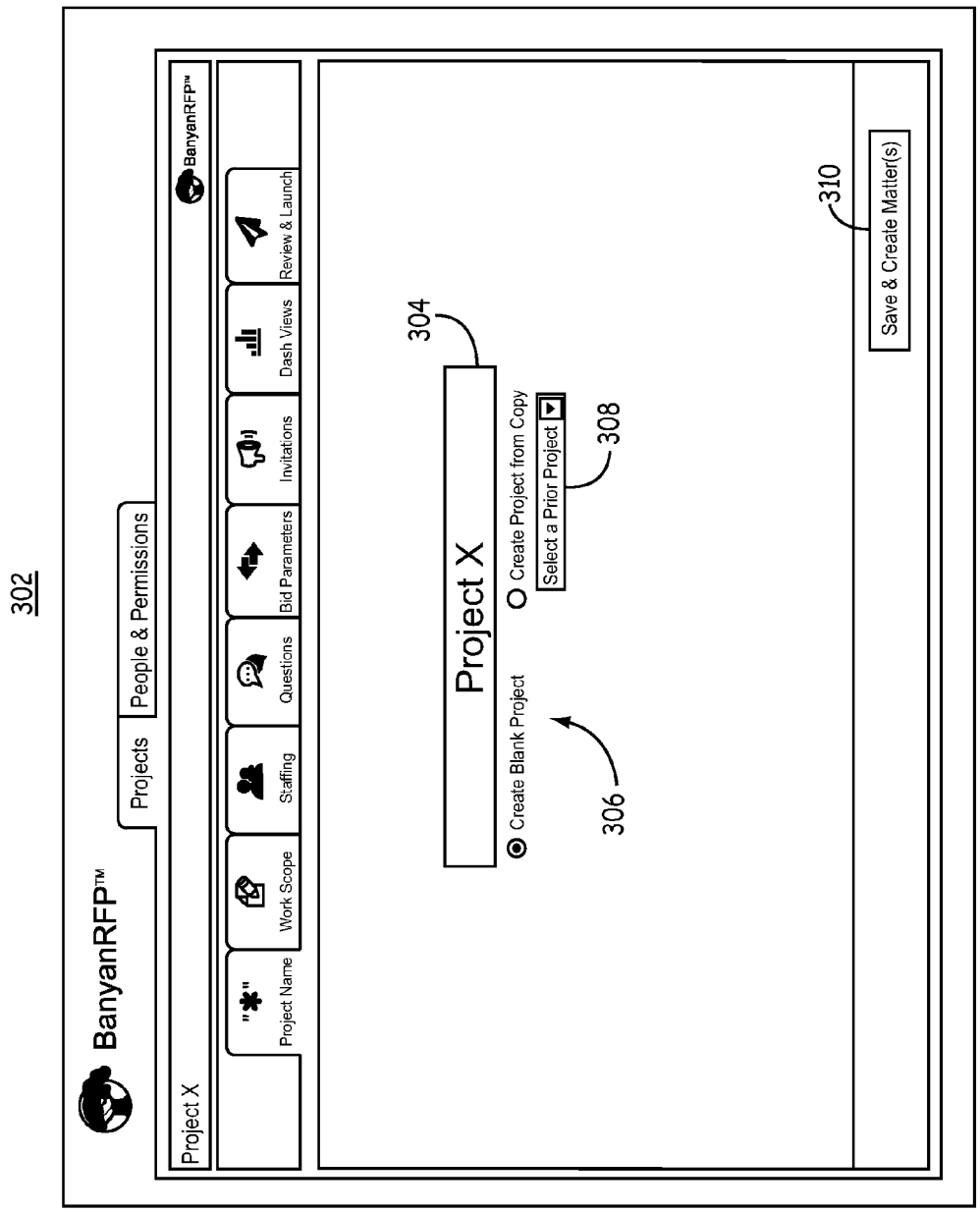
FIGS. 3A-3Q illustrate one example of the operation of prompting a customer for, and receiving therefrom, RFP information using the system of FIG. 1.
Figure 3B:
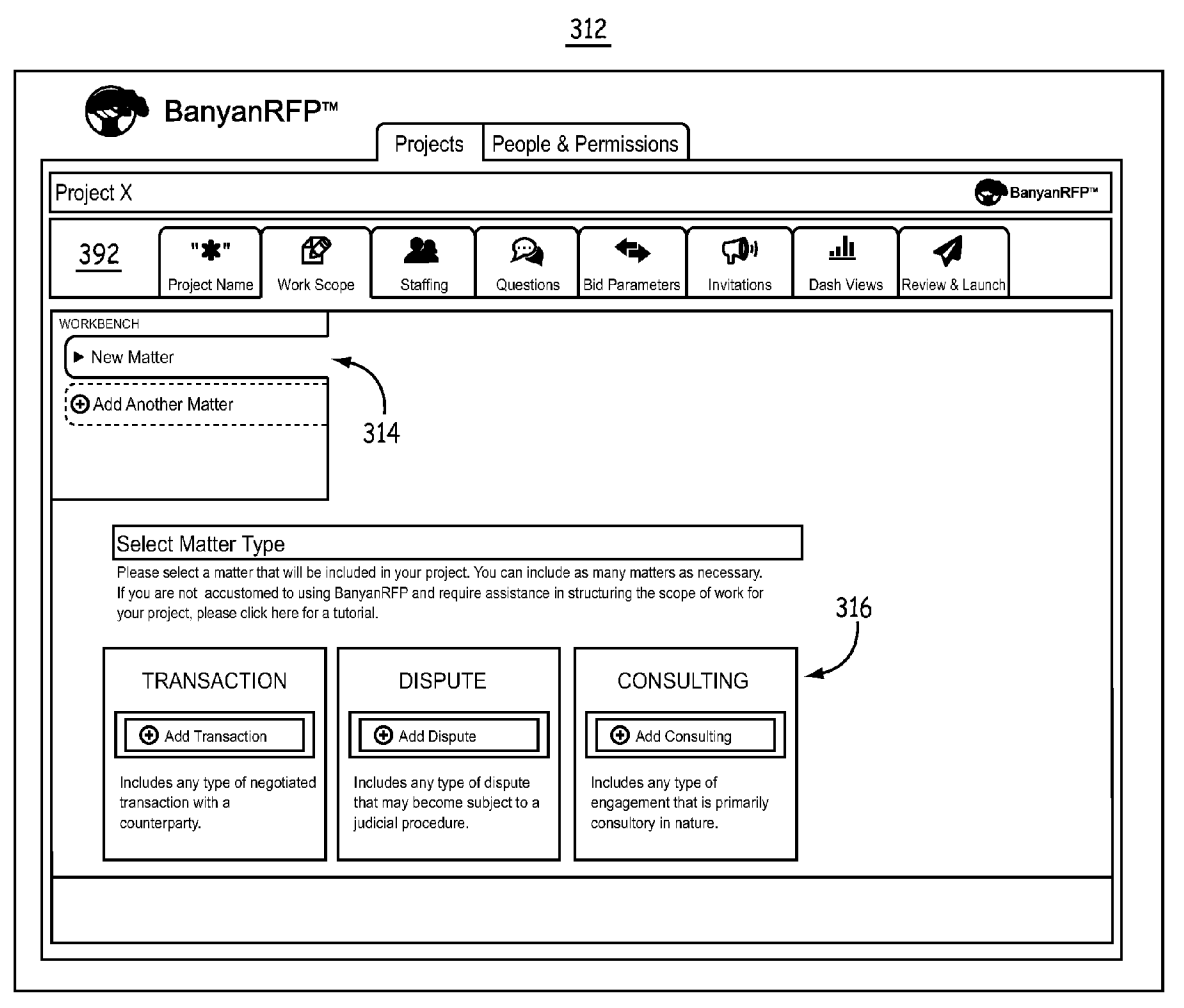
Figure 3C:
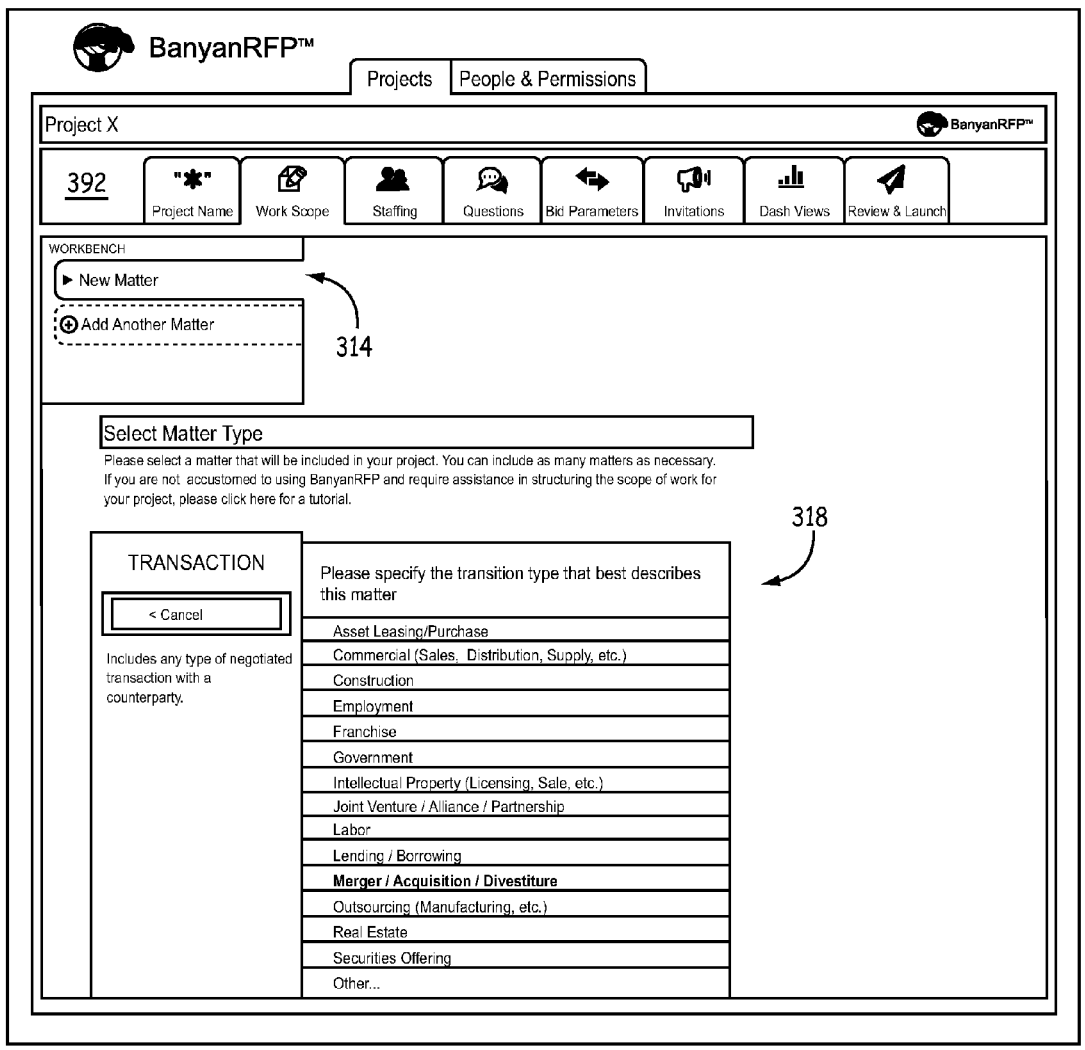
Figure 3D:
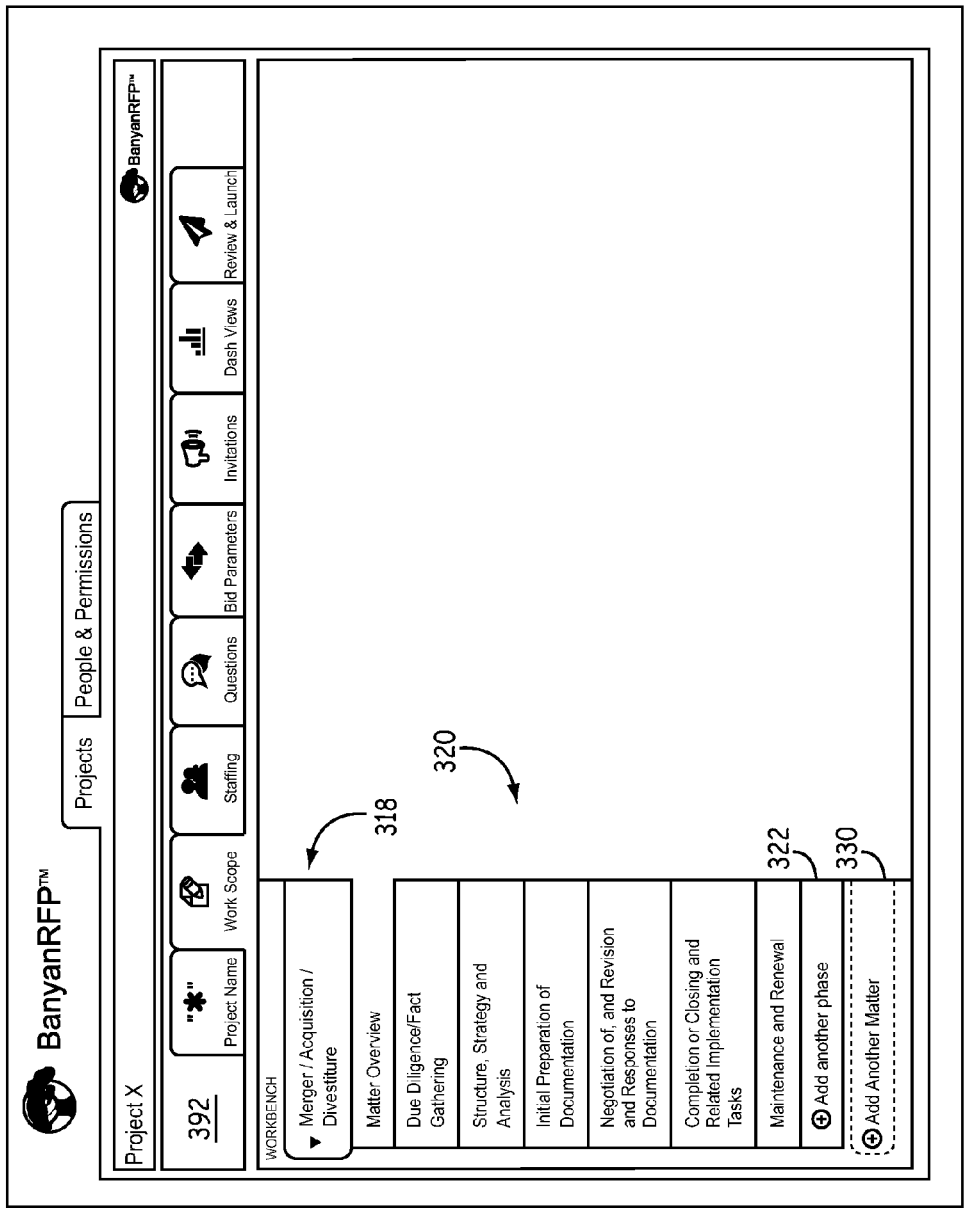
Figure 3F:
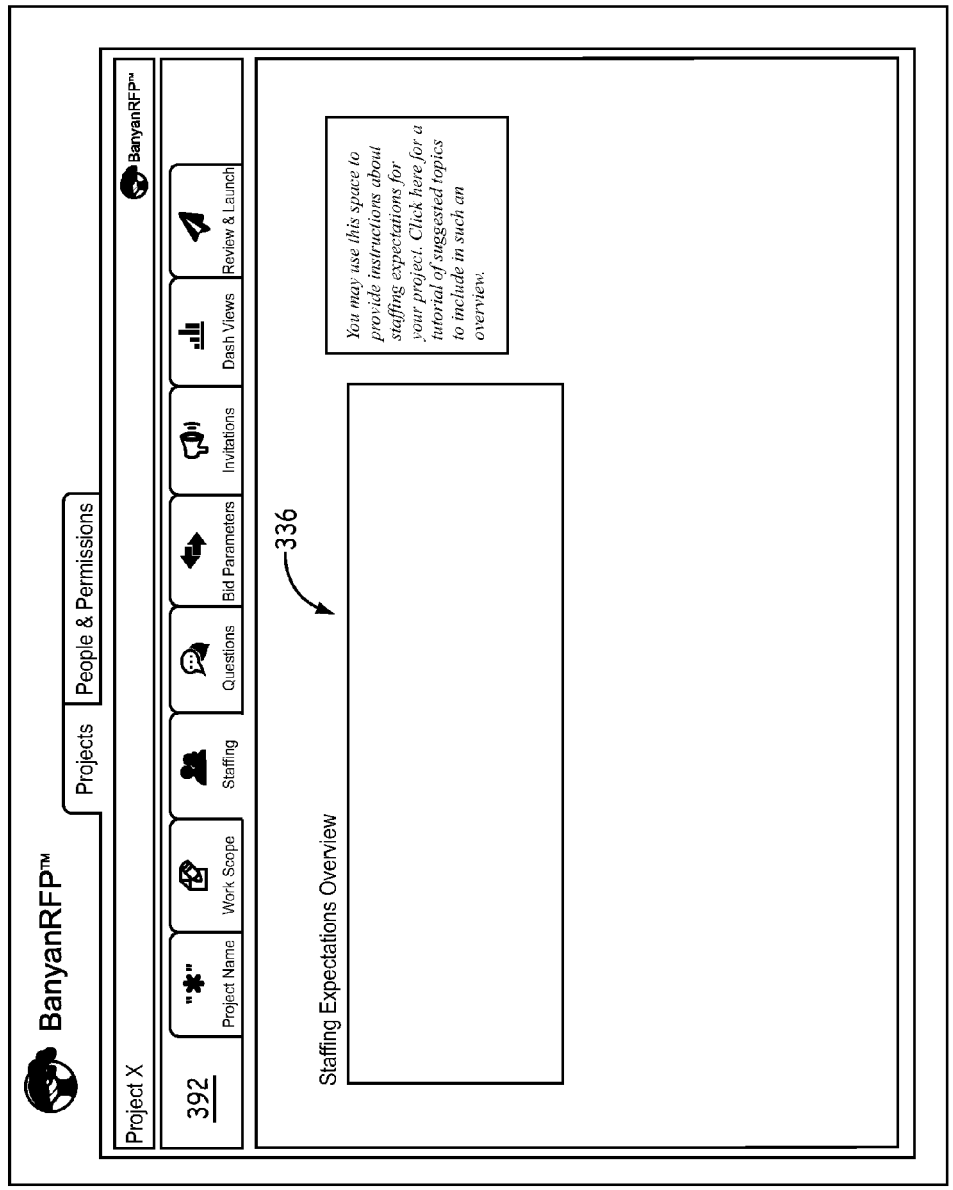
Figure 36:
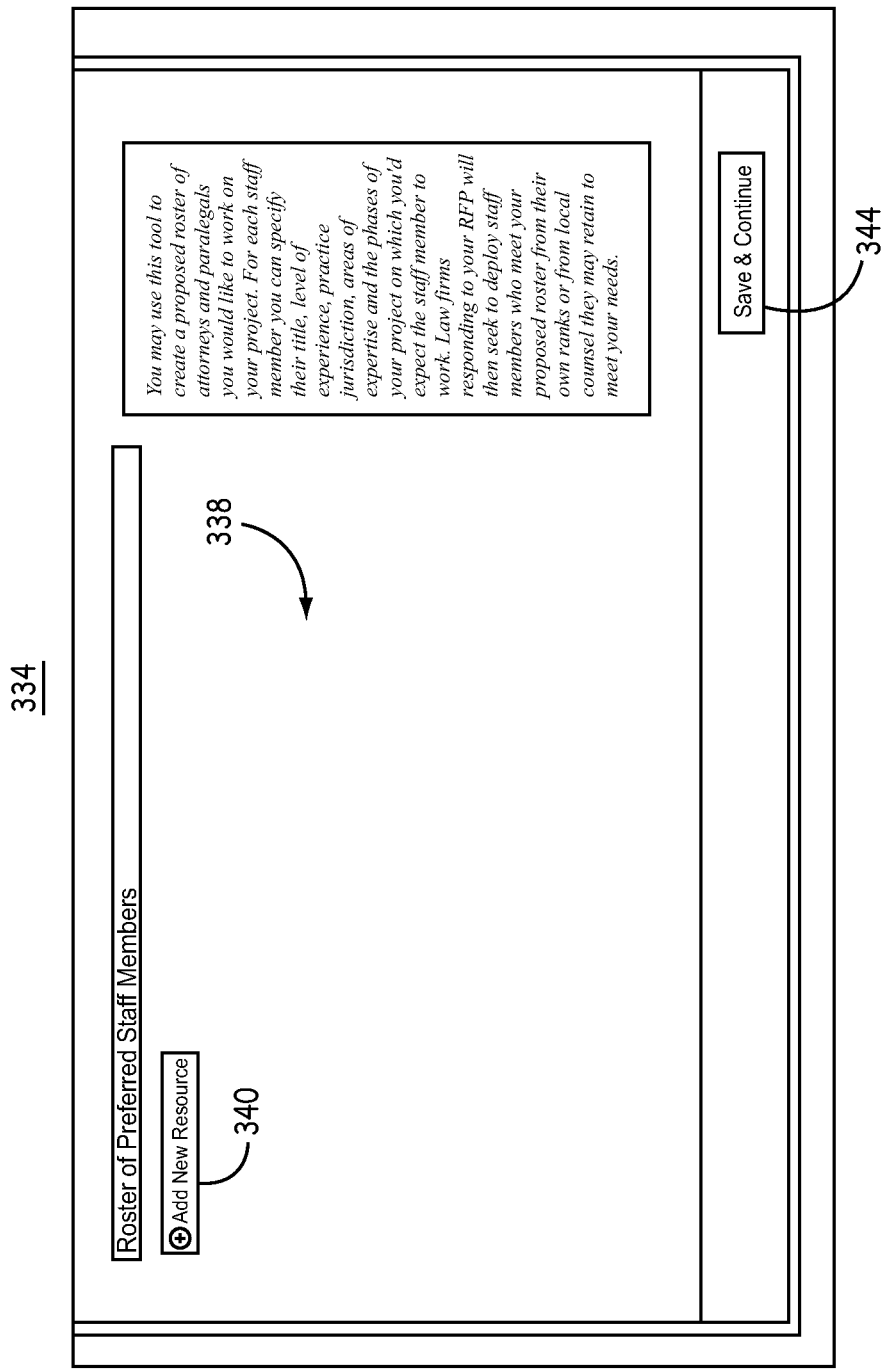
Figure 3I:
Figure 3J:
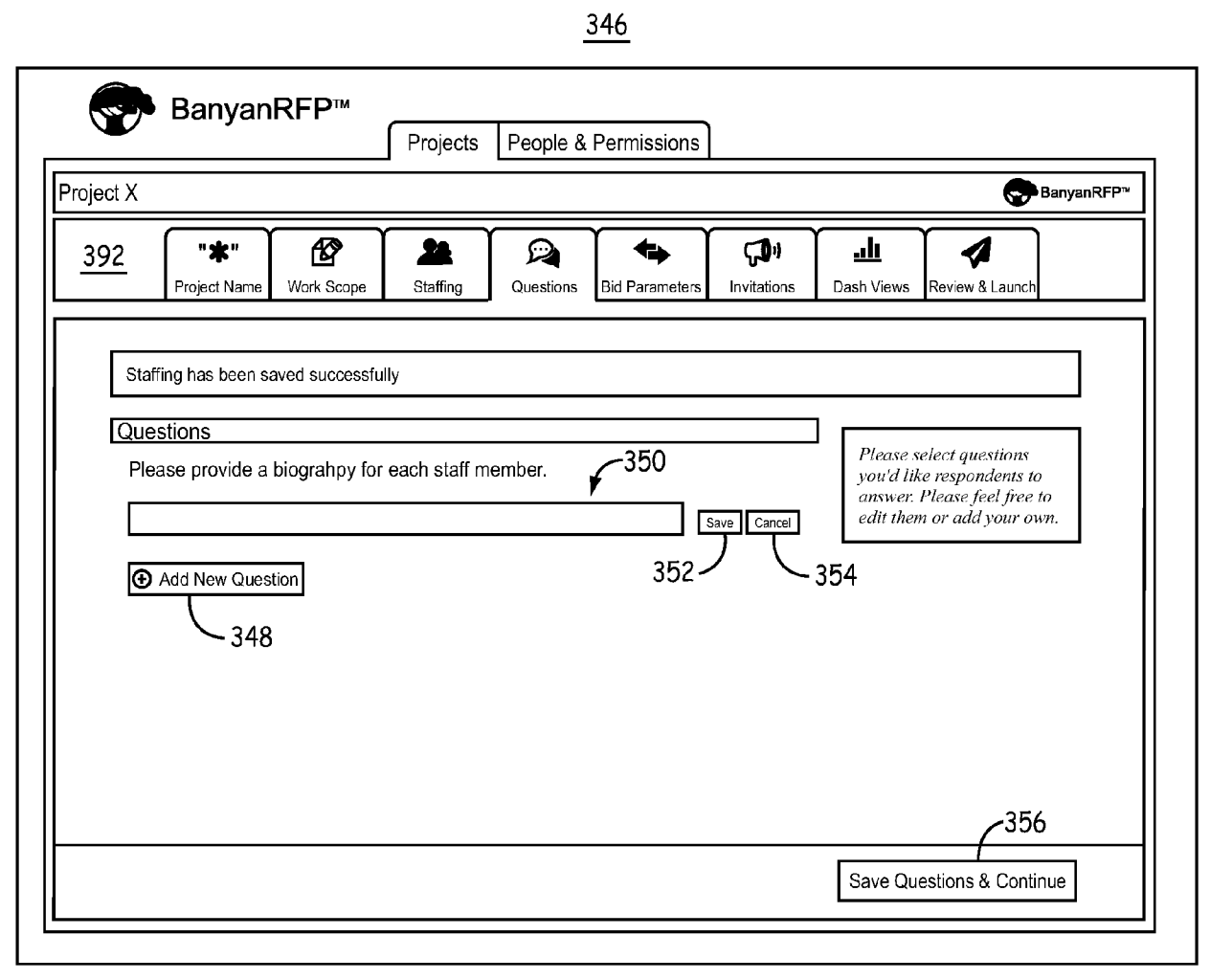
Figure 3N:
Figure 3Q:
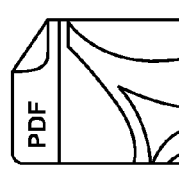

FIGS. 3A-3Q illustrate the operation of one exemplary embodiment of the RFP website 104 in connection with prompting a customer for, and receiving therefrom, RFP information 142. That is, FIGS. 3A-3Q illustrate one exemplary implementation of the processing described above in connection with block 206 of FIG. 2A. As such, the example shown in FIGS. 3A-3Q is described here as being implemented in the system 100 of FIG. 1 for use in method 200 of FIGS. 2A-2B (though other embodiments can be implemented in other ways).

In this example, when the customer 128 logs onto the RFP website 104 and clicks or otherwise actuates a user interface element that is associated with creating a new project, the RFP website 104 presents a page 302 (shown in FIG. 3A) that displays a text field 304 in which the customer 128 is able to enter a name for the new project (as shown in FIG. 3A). This page is also referred to here as the "project name" page 302. In this example, the project name page 302 includes a set of radio buttons 306 that the customer 128 can use to create the new project as "blank project" or create the new project by copying RFP information 142 entered for a prior project. The project name page 302 also displays a drop-down list 308 that the customer 128 can use to specify the prior project for copying. In the case where the customer 128 chooses to copy RFP information 142 entered for a prior project, the RFP information 142 entered for the prior project is used to populate the various pages described below as default values, which the user can then edit as needed to reflect the needs of the new project. In some situations, doing this can make it easier to enter the RFP information 142 for the new project.

The project name page 306 also displays "Save & Create Matter(s)" button 310. When the customer 128 has entered a name for the new project and has selected how the new project will be created, the customer 128 can click button 310 in order to cause the RFP website 104 to save the project name and proceed to creating one or more "matters" for the new project.

In the example described here in connection with FIGS. 3A-3Q, the new project is created using the blank project option and, as a result, the various pages are initially presented in a blank or default state.

In this example, the RFP website 104 is used to manage an RFP process for a legal services project. Each project is organized as a set of one or more matters that the customer 128 would like bid on as a group. Each matter can also include one or more phases.

In this example, the RFP website 104 is configured to display a page 312 (shown in FIGS. 3B-3E) that the customer 128 can use to enter work scope information 145. This page 312 is also referred to here as the "work scope" page 312. When the work scope page 312 is first displayed in its blank or default state, the page 312 includes one matter 314 (initially labeled "New Matter"). The work scope page 312 includes a set of buttons 316. Each button 316 is associated with a different type of matter. In this example, there are three types of matters—a transaction matter type, a dispute matter type, and a consulting matter type.

In this example, the customer 128 clicks on the button 316 for the transaction matter type. Then, as shown in FIG. 3C, the work scope page 312 is updated to display a selection list 318 that lists various types of transaction matters. In this example, the customer 128 selects the "Merger/Acquisition/Divestiture" type. FIG. 3D shows the upper portion of the updated work scope page 312 at this point, and FIG. 3E shows the lower portion of the updated work scope page 312 at this point.

As shown in FIG. 3D, the upper portion of the work scope page 312 is updated so that the "New Matter" matter 314 is replaced with a "Merger/Acquisition/Divestiture" matter 318. This "Merger/Acquisition/Divestiture" matter 318 is initially displayed with a default set of phases 320. The customer 128 is able to delete an individual phase 320 or the matter 318 as a whole by clicking on a trash can button (not shown) that is displayed whenever the customer 128 hovers the pointer over the label for that phase 320 or matter 318. Also, as shown in FIG. 3D, the customer 128 can add another phase by clicking on the "Add another phase" button 322, in which case the customer 128 is prompted for a name for the new phase.

When the customer 128 clicks on the label associated with the "Merger/Acquisition/Divestiture" matter 318, the lower portion of the page 312 (shown in FIG. 3E) is updated to instruct the customer 128 to provide an overview for this matter 318. The page 312 is updated to include a text box 324 in which the customer 128 can enter text providing the matter overview. The text box 324 has an associated "Save Changes" button 326 that the customer 128 can click on in order to save any changes made to the matter overview entered into the text box 324. The page 312 also includes an "Attach Document(s)" button 328 that the customer 128 can click on in order to attach one or more documents that provide the matter overview (or other information about the matter 318).

The customer 128 can enter an overview for each of the phases 320 in a similar matter. That is, when the customer 128 clicks on the label associated with a phase 320, the lower portion of the work scope page 312 is updated (not shown) to instruct the customer 128 to provide an overview for this phase 320. The lower portion of the page work scope 312 is also updated to include a text box, "Save Changes" button, and "Attach Document(s)" button like the ones shown in FIG. 3E, which the customer 128 can use to provide an overview for that phase 320.

As shown in FIG. 3D, the customer 128 can add another matter by clicking on an "Add Another Matter" button 330 displayed on the upper portion of the work scope page 312. The customer would then identify a type for the new matter and enter an overview for the new matter and the phases of that new matter, as described above in connection with FIGS. 3C-3D.

As shown in FIG. 3E, the lower portion of the work scope page 312 includes a "Save" button 332 that the customer 128 can click on in order to save the work scope information that has been entered using the work scope page 312.

In this example, the RFP website 104 is configured to display a page 334 (shown in FIGS. 3F-3H) that the customer 128 can use to enter staffing information 146. This page 334 is also referred to here as the "staffing" page 334. FIG. 3F shows the upper portion of the staffing page 334, and FIG. 3G shows the lower portion of the staffing page 334.

When the staffing page 334 is first displayed in its blank or default state, the upper portion of the staffing page 334 includes a text box 336 in which the customer 128 can enter an overview of the customer's expectations regarding the staffing of the project.

The customer 128 can also use the staffing page 334 to enter a roster of preferred staff members that the customer 128 would like to work on the project. These staff member are also referred to here "staffing resources." As shown in FIG. 3G, the lower portion of the staffing page 334 includes a "Roster of Preferred Staff Members" section 338. This section 338 includes an "Add New Resource" button 340. The customer 128 clicks on button 340 to add each of the preferred staff members the customer 128 would like to work on the project. Each time the user clicks on this button 340, the "Roster of Preferred Staff Members" section 338 of the staffing page 334 is updated to include a new section 342 (shown in FIG. 3H) that the customer 128 can use to enter information about a particular staff member (that is, a staffing resource) the customer 128 would like to work on the project. In this example, each section 342 includes user interface controls for the customer 128 to specify a name for the associated staffing resource, an experience level for the staffing resource, one or more jurisdictions in which the staffing resource is licensed, one or more areas of expertise for the staffing resource, and one or more phases of the various matters that the customer 128 would like that staffing resource to work on.

In this example, entering a roster of preferred staff members is optional.

In this example, as shown in FIGS. 3G and 3H, the lower portion of the staffing page 334 also includes a "Save & Continue" button 344 that the customer 128 can click on when the customer 128 is done entering staffing information 146. Clicking on button 344 causes the RFP website 104 to save in the database 162 the staffing information 146 the customer 128 has entered and causes the RFP website 104 to move on to the entering of any questions 147 for the RFP.

In this example, the RFP website 104 is configured to display a page 346 (shown in FIGS. 3I-3J) that the customer 128 can use to enter any questions 147 the customer 128 would like the bidders 132 to respond to in their proposals 144. This page 346 is also referred to here as the "questions" page 346.

When the questions page 346 is first displayed in its blank or default state (as shown in FIG. 3I), the questions page 346 includes an "Add New Question" button 348 that the customer 128 can click on to add a new question. When the customer 128 clicks on the "Add New Question" button 348, the RFP Website 104 updates the questions page 346 to display a new text box 350 (shown in FIG. 3J) in which the customer 128 can enter a question. Prior to the customer 128 saving the new question entered in a given text box 350, each text box 350 has an associated "Save" button 352 that the customer 128 can click on to save the question the customer 128 has entered and an associated "Cancel" button 354 that the customer 128 can click on in order to cancel the entry of that question 147 (in which case the associated text box 350 is removed from the page 346). After the newly entered question has been saved, the questions page 346 is updated so that the text box 350 is replaced with a text label (not shown) that displays the entered question. In this example, if the customer 128 hovers the pointer over this text label, the page 346 displays an "Edit" button (not shown) that the customer 128 can click on in order to edit the question and a "Remove" button (not shown) that the customer 128 can click on in order to delete the question 147.

The questions page 346 also includes a "Save & Continue" button 356 that the customer 128 can click on when the customer 128 is done entering questions 147. Clicking on button 356 causes the RFP website 104 to save in the database 162 the questions 147 the customer 128 has entered and causes the RFP website 104 to move on to the entering of bid parameter information 148 for the RFP.

In this example, the RFP website 104 is configured to display a page 358 (shown in FIGS. 3K-3M) that the customer 128 can use to enter bid parameter information 148 for the RFP. This page 358 is also referred to here as the "bid parameters" page 358. FIG. 3K shows the upper portion of the bid parameters page 358, and FIG. 3L shows the lower portion of the bid parameters page 358.

When the bid parameters page 358 is first displayed in its blank or default state, the upper portion of the bid parameters page 358 includes a "Selection Criteria" text box 360 in which the customer 128 can enter information about the criteria the customer 128 will use to select the winning bidder 132.

The upper portion of the bid parameters page 358 also includes a "Preferred Fee Method" text box 362 in which the customer 128 can enter information about any fee methods that the customer 128 prefers the bidders 132 to use and/or what fee-related factors are most important to the customer 128.

In some embodiments, the customer 128 is also able to enter information about expenses relating the project (and/or any matter or phase included as a part of the project). For example, the customer 128 can indicate what types of expenses it believes are likely to be incurred in connection with the project and/or its expectations regarding expenses (including, for example, ranges of reasonable expenses, preferred third-party vendors, and its policies, and/or preferences regarding the billing or incurring of expenses).

As shown in FIG. 3L, the lower portion of the bid parameters page 358 also includes a "Currency Issues" section 364 in which the customer 128 can enter currency-related information. In this example, "Currency Issues" section 364 includes drop-down list 366 that the customer 128 uses to select a primary currency that the customer 128 would like proposals 132 to be presented in. The "Currency Issues" section 364 also includes one or more "Currency Conversion Rate" sub-sections 367 in which the customer 128 can enter information about the conversion rates that bidders 132 should use in converting from other currencies to the primary currency as they submit their financial proposals.

The lower portion of the bid parameters page 358 also includes a "Timeline Parameters" section 368 in which the customer 128 can specify how many bidding rounds there will be and a start date and time and an end date and time for each bidding round. The "Timeline Parameter" section 368 includes an "Add Bidding Round" button 370 that the customer 128 can click on in order to add another bidding round to the project. When the customer clicks on the "Add Bidding Round" button 370, the bid parameters page 358 is updated to display a sub-section 372 (shown in FIG. 3M) for a new bidding round that the customer 128 can use to enter a name, start date and time, and end date and time for that bidding round.

The lower portion of the bid parameters page 358 also includes an "Additional Parameters" text box 374 in which the customer 128 can enter any additional parameters that the customer 128 believes will help the bidders 132 submit a meaningful proposal 144 for the project.

The lower portion of the bid parameters page 358 also includes a "Save & Continue" button 376 that the customer 128 can click on when the customer 128 is done entering the bid parameter information 148 for the project. Clicking on button 376 causes the RFP website 104 to save in the database 162 the bid parameter information 148 the customer 128 has entered and causes the RFP website 104 to move on to the entering of bidder information 149 for the RFP.

In this example, the RFP website 104 is configured to display a page 378 that the customer 128 can use to enter bidder information 149 for the RFP. This page 378 is also referred to here as the "bidder" page 378.

As shown in FIG. 3N, the bidder page 378 includes an "Add Invitee" button 380 that the customer 128 can click on in order to add contact information for a service provider (bidder 132) that the customer 128 would like to invite to submit a bid (proposal 144) for the RFP. Each time the customer 128 clicks on the "Add Invitee" button 380, the bidder page 378 is updated to display a set of text fields 382 (shown in FIG. 3O) in which the customer 128 can add the name of the service provider ("Firm Name"), a contact name for the service provider, and an email address for that contact.

The bidder page 378 also includes an "invite message" text box 381 in which the customer 128 can enter a custom message that will be sent to all of the service providers identified on the bidder page 378 inviting them to submit a proposal in response to the RFP.

The bidder page 378 also includes a "Save & Continue" button 383 that the customer 128 can click on when the customer 128 is done entering the bidder information 149. Clicking on button 383 causes the RFP website 104 to save in the database 162 the bidder information 149 the customer 128 has entered and causes the RFP website 104 to move on to the entering of comparative metric information 150 for the RFP.

In this example, the RFP website 104 is configured to display a page 384 (shown in FIG. 3P) that the customer 128 can use to specify which comparative metrics will be displayed in summary form (for example, in a "dashboard" view) for the customer 128 to view and for the bidders 132 to view. This page 384 is also referred to here as the "comparative metric" page 384.

The comparative metrics includes both total project cost as well as detailed comparative metrics. As noted above, the detailed comparative metrics described here include information about a bidder's proposal 144 that go beyond merely the total proposed project cost and include more detailed metrics about a bidder's proposal 144.

As shown in FIG. 3P, the comparative metric page 384 includes a list of various items that can be displayed in summary form (for example, in a dashboard view). The customer 128 can use the list to specify which items will be displayed in summary form for the customer 128 to view and separately specify which items will displayed in summary form for the bidders 132 to view. The comparative metrics that the customer 128 wishes to see can, and will likely, be different from the comparative metrics that the customer 128 will permit the bidders 132 to be able to see.

Included within this list are one or more detailed comparative metrics. Although a few detailed comparative metrics are shown in FIG. 3P, it is to be understood that other detailed comparative metrics can be used as well. Examples of detailed comparative metrics suitable for use in a legal services project include, without limitation: estimated total hours for the project or one or more matters or phases, estimated total fees for the project or one or more matters or phases, blended rates for the project or one or more matters or phases, estimated effective blended rate for the project or one or more matters or phases, estimated standard fees for the project or one or more matters or phases, estimated discounted fees plus estimated expenses for the project or one or more matters or phases, hours by level of experience for the project or one or more matters or phases, and estimated discounted fees by level of experience for the project or one or more matters or phases.

The comparative metric page 384 also includes a "Save & Continue" button 386 that the customer 128 can click on when the customer 128 is done entering the comparative metric information 150. Clicking on button 386 causes the RFP website 104 to save in the database 162 the comparative metric information 150 the customer 128 has entered and causes the RFP website 104 to generate the RFP document 141 for the project and move on to a page where the customer 128 can review the RFP document 141.

In this example, the RFP website 104 is configured to display a page 388 (shown in FIG. 3Q) that the customer 128 can use to review the RFP document 141 that is generated for the project and to launch the RFP process for the project. This page 388 is also referred to here as the "review and launch" page 388.

As shown in FIG. 3Q, the review and launch page 388 includes a button 390 that the customer 128 can click on in order to display the RFP document 141 that has been generated from the current RFP information 142 the customer 128 has entered and saved in the database 162. If after reviewing the RFP document 141, the customer 128 wishes to change some of the RFP information 142, the customer 128 can return to the appropriate page and edit that RFP information 142. Then, the customer 128 can save the updated RFP information 142 (for example, by clicking the appropriate "Save & Continue" button), after which the RFP website 104 will generate an updated RFP document 141 that reflects the updated RFP information 142. The customer 128 can then return to the review and launch page 388 to review the updated RFP document 141 and further edit any RFP information 142.

The various pages described here in connection with FIGS. 3A-3Q include a navigation section 392 that includes a respective tab for each of the pages described above in connection with FIGS. 3A-3Q. The customer 128 can cause the RFP website 104 to display a particular page by clicking on the appropriate tab in the navigation section 392.

The review and launch page 388 also includes a "Launch Project" button 394. When the customer 128 has finished reviewing the RFP document 141 and revising the RFP information 142 for the project, the customer 128 can click on the "Launch Project" button 394 to start or "launch" the RFP process for the project. As noted above in connection with FIGS. 2A-2B, after the customer 128 has launched the RFP process, the RFP website 104 invites the identified bidders 132 to submit proposals 144 in response to the RFP for this project.

FIGS. 4A-4O illustrate the operation of one exemplary embodiment of the RFP website 104 in connection with prompting a bidder for, and receiving therefrom, proposal information 144. That is, FIGS. 4A-4O illustrate one exemplary implementation of the processing described above in connection with block 220 of FIG. 2A. As such, the example shown in FIGS. 4A-4O is described here as being implemented in the system 100 of FIG. 1 for use in method 200 of FIGS. 2A-2B (though other embodiments can be implemented in other ways).

After the bidder 132 has been invited to submit a proposal 144 in response to an RFP for a project, the bidder 132 can log on to the RFP website 104. The RFP website 104 first presents the bidder 132 with a page 402 (shown in FIG. 4A) that displays a list of projects that the bidder 132 has been invited to bid on. This page 402 is also referred to here as the "projects" page 402.

In this example, the invitation email sent to the bidder 132 includes the name of the project that the bidder 132 has been invited to bid on. The bidder 132 can use this project name to identify that project in the project list displayed on the projects page 402.

For those projects that the bidder 132 has not submitted a proposal 144 for, if the bidder 132 clicks on the label associated with that project, the RFP website 104 displays a page 404 (shown in FIG. 4B) that enables the bidder 132 to review the RFP document 141 that the customer 128 has prepared for that project. This page 404 is also referred to here as the "review RFP" page 404. The review RFP page 404 includes a button 406 that the bidder 132 can click on to review the RFP document 141 that the customer 128 prepared for the project.

The review RFP page 404 also includes a "Start Proposal" button 408 that the bidder 132 can click on to start preparing a proposal to submit in response to the RFP when the bidder 132 is ready to do so.

When the bidder 132 clicks on the "Start Proposal" button 408, the RFP website 104 displays a page 410 (shown in FIGS. 4C-4F) that the bidder 132 can use to enter the bidder's staffing information 152. This page 410 is also referred to here as the "resources" page 410. FIG. 4C shows the upper portion of the resources page 410, and FIGS. D and F show the lower portion of the resources page 410.

As noted above, the RFP document 141 that the RFP website 104 generated for the project (from the customer's RFP information 142) will include any expectations the customer 128 has specified regarding how the project should be staffed and, possibly, a roster of preferred staff members.

In this example, the upper portion of the resources page 410 (as shown in FIG. 4C) includes a "Staffing Expectations" section 412 in which the roster of preferred staff members (if any) that the customer 128 prepared for the project is displayed. The roster is displayed in a box 414. The bidder 132 can scroll through the staffing resources listed in the box 414.

In this example, the lower portion of the resources page 410 (as shown in FIG. 4D) includes a "Your Resources" section 416 that the bidder 132 uses to enter information about the people the bidder 132 will include in the bidder's proposal 144.

The "Your Resources" section 416 includes an "Add Resource" button 418 that the bidder 132 can click on in order to enter information about a person that the bidder 132 will be including in the bidder's proposal 144. When the bidder 132 clicks on the "Add Resource" button 418, the RFP website 104 displays an overlay 420 (shown in FIG. 4E) that includes user interface elements for entering the person's name, the firm or other entity the person is affiliated with, the person's experience level, the person's standard billing rate, the jurisdictions in which the person is licensed, and the person's areas of expertise.

After the bidder 132 enters this information using the overlay 420 and saves it, the "Your Resources" section 416 of the resources page 410 is updated to reflect the added person. FIG. 4F shows the "Your Resources" section 416 of the resources page 410 after some people that the bidder 132 will include in its proposal 144 have been added.

The lower portion of the resources page 410 also includes a "Save & Continue" button 422 that the bidder 132 can click on when the bidder 132 is done entering its staffing information 152. Clicking on button 422 causes the RFP website 104 to save in the database 162 the staffing information 152 the bidder 132 has entered and causes the RFP website 104 to move on to the entering of financial proposal information 154 for the bidder's proposal 144.

In this example, the RFP website 104 is configured to display a page 424 (shown in FIGS. 4G-4L) that the bidder 132 can use to enter its financial proposal information 154. This page 424 is also referred to here as the "financial proposal" page 424.

In this example, the project is organized as a set of matters, where each matter has one or more phases. The RFP website 104 is configured to display, in the financial proposal page 424, a separate section 426 for each matter included in the project. These sections 426 are also referred to here as "matter sections" 426.

Also, the RFP website 104 is configured to display, in each matter section 426, a separate sub-section 428 for each phase of the associated matter. These sub-sections 428 are also referred to here as "phase sub-sections" 428.

The bidder 132 can use the financial proposal page 424 to enter a set of line items 430 in each phase sub-section 428. Each line item 430 is used to specify how a fee total for that line item 430 is to be calculated.

Each phase sub-section 428 includes a respective "Add Resource" button 432 that the bidder 132 can click on in order to add a line item 430 to the associated phase sub-section 428.

FIG. 4G shows a first portion of the financial proposal page 424 before any line items 430 have been added. When the bidder 132 clicks on the "Add Resource" button 432 associated with the "Due Diligence/Fact Gathering" phase of the "Stock Acquisition" matter, a resource line item 430 is added to the phase sub-section 428 associated with the "Due Diligence/Fact Gathering" phase. Each line item 430 includes a drop-down list 434 that the bidder 132 can use to scroll through the list of people that the bidder 132 added via the resources page 410 and select one for that line item 430. As noted above, each staffing resource that the bidder 132 added via the resources page 410 has an associated standard billing rate. The standard billing rate for the person (staffing resource) that was selected by the bidder 132 is shown in the line item 430. Each line item 430 also includes a drop-down list 436 that the bidder 132 can use to scroll through a list of "billing method entities." Each line item 430 also includes a text field 438 in which the bidder 132 enters an estimated number hours that are to be used for that line item 430. Each line item 430 also includes an associated fee total field 440 in which the fee total for that line item 430 is displayed.

A "billing method entity" is associated with a particular type of billing method and with a set of line items 430. The set of line items 430 that are associated with a given billing method entity can include line items 430 from one or more phases or one or more matters. A "billing method" specifies how the fee total for each associated line item 430 is to be computed.

In this example, there are four basic billing methods that can be applied to individual line items 430—standard hourly, discounted/premium hourly, blended hourly, and fixed fee.

The standard hourly billing method computes the fee total for each associated line item 430 by simply multiplying the standard billing rate for each line item 430 by the estimated number of hours for that line item 430 and uses the result as the fee total for that line item 430. The result of applying the standard hourly billing method to a given line item 430 is also referred to here as the "standard fee" for that item 430.

In this example, a single billing method entity that specifies the standard hourly billing method is provided by default and the bidder 132 is not able to edit or delete that entity.

The discounted/premium hourly billing method computes the fee total for each associated line item 430 by first computing the standard fee for that item 430 as described above in connection with the standard hourly billing method and then multiplying the resulting standard fee by a percentage. The result is then used as the fee total for the associated line item 430.

Each billing method entity that specifies the discounted/premium billing method has an associated percentage that must be specified. If the associated percentage is less than 1, then that billing method entity is applying a discount to the standard fee. If the associated percentage is greater than 1, then that billing method entity is applying a premium to the standard fee.

In this example, whenever the bidder 132 creates a new billing method entity that uses the discounted/premium hourly billing method or edits an existing billing method entity that uses the discounted/premium hourly billing method, the bidder 132 must specify the percentage that is to be applied to the associated set of line items 430.

The blended hourly rate billing method computes the fee total for each associated line item 430 by multiplying a specified "blended" billing rate by the estimated number of hours for that line item 430 and uses the result as the fee total for that line item 430. That is, with the blended hourly rate billing method, a single blended hourly rate is applied to all of the associated line items 430, instead of using the respective individual standard billing rate that is specified for each of the associated line items 430.

Each billing method entity that specifies the blended hourly rate billing method has an associated blended billing rate that must be specified. In this example, whenever the bidder 132 creates a new billing method entity that uses the blended hourly rate billing method or edits an existing billing method entity that uses the blended hourly rate billing method, the bidder 132 must specify the blended rate that is to be applied to the associated set of line items 430.

With the fixed fee billing method, the total fee that is to be used for all of the associated line items 430 is a specified fixed amount (referred to here as the "fixed fee"). In this example, for the purposes of the financial proposal page 424, a portion of the specified fixed fee amount is allocated to each associated line item 430 by calculating the standard fee for each item and then allocating the fixed fee amount to the associated line items 430 on a pro rata basis using the standard fee. Doing this ensures that the various totals and sub-totals that are displayed in the financial proposal page 424 will add up properly.

Each billing method entity that specifies the fixed fee billing method has an associated fixed fee that must be specified. In this example, whenever the bidder 132 creates a new billing method entity that uses the fixed fee billing method or edits an existing billing method entity that uses the fixed fee billing method, the bidder 132 must specify the fixed fee that is to be applied to the associated set of line items 430.

In addition to billing rating attributes, each billing method has an associated name, label, or other identifier that can be used to distinguish between billing method entities that have the same billing related attributes. For example, a bidder 132 may wish to create multiple fixed-fee billing "traunches", with each traunch being applied to a different set of line items. In this case, multiple billing method entities would be created having the same fixed-fee attributes (that is, the same fixed-fee dollar amount), where each billing method entity would be assigned a different name in order for the bidder 132 to distinguish between the entities and apply them to different sets of line items.

If the bidder 132 edits an existing billing method entity, the RFP website 104 automatically updates all of the line items 430 that are associated with that billing method entity. For example, if a particular billing method entity first specifies applying the discount/premium billing method using a discount percentage of 20% and thereafter the bidder 132 edits that billing method entity to change the discount percentage to 25% (for example, to make its financial proposal 154 more competitive), the RFP website 104 will automatically update all of the line items 430 that are associated with that billing method entity to reflect the new discount percentage of 25% and re-calculate the associated phase, matter, and project totals.

By using such billing method entities, the bidder 132 can use the financial proposal page 424 to assemble a complex financial proposal 154 that applies multiple billing methods across various groups of line items 430. Also, the use of such billing method entities enables bidders 132 to easily update their financial proposals 154 (for example, to make their financial proposals 154 more competitive during the RFP process).

Figure 4B:
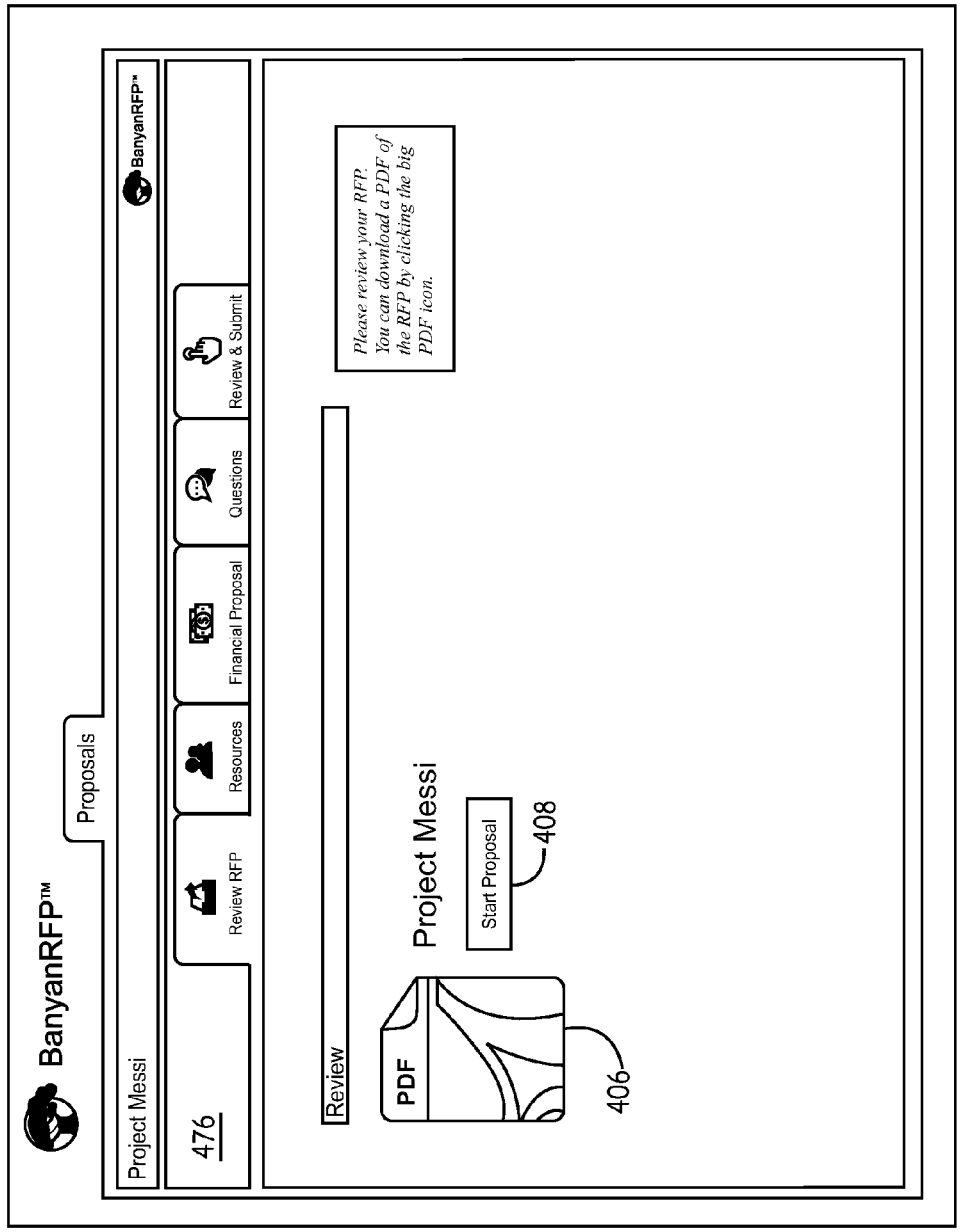
FIGS. 4A-4O illustrate one example of prompting a bidder for, and receiving therefrom, proposal information using the system of FIG. 1.
Figure 4D:
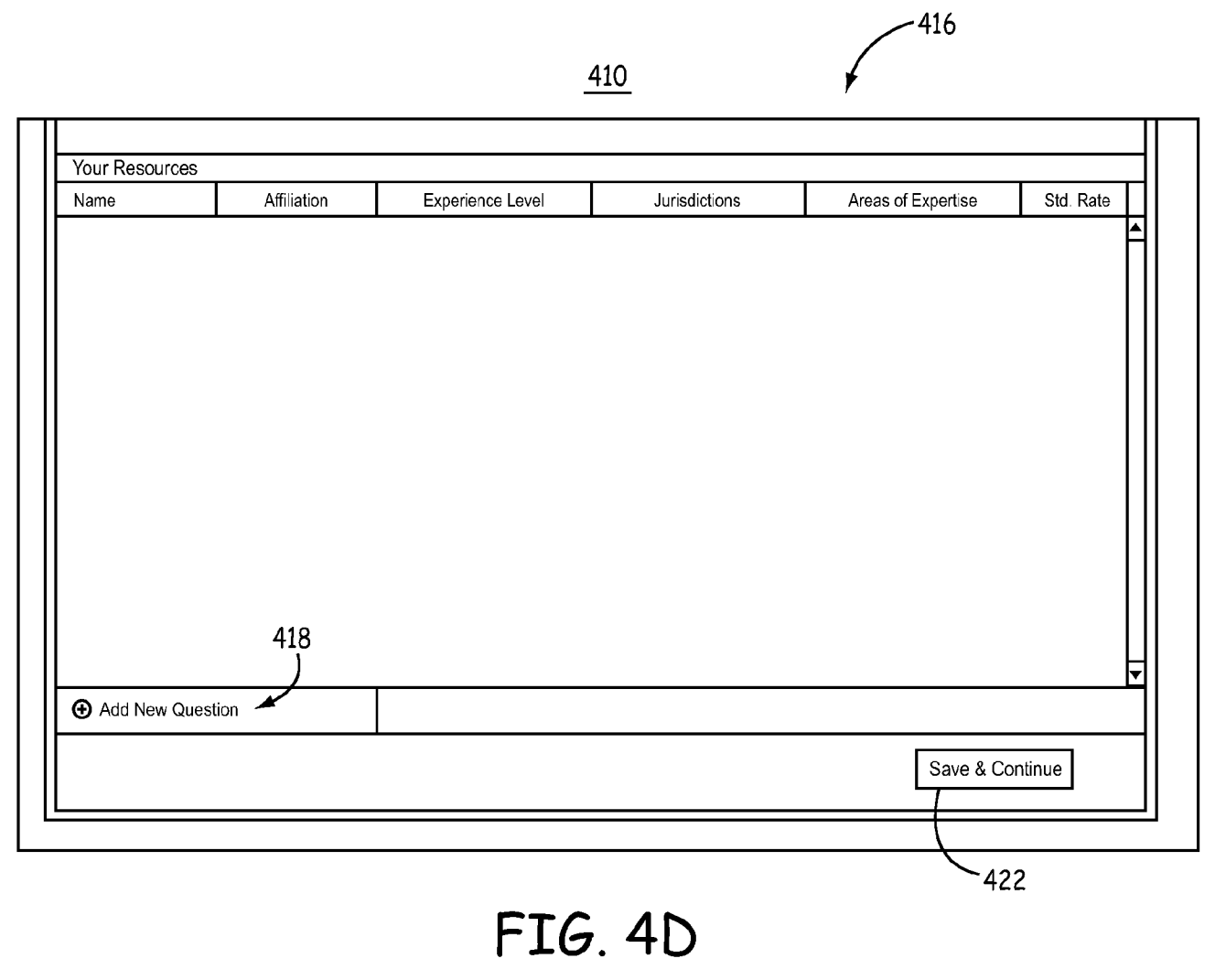
Figure 4E:
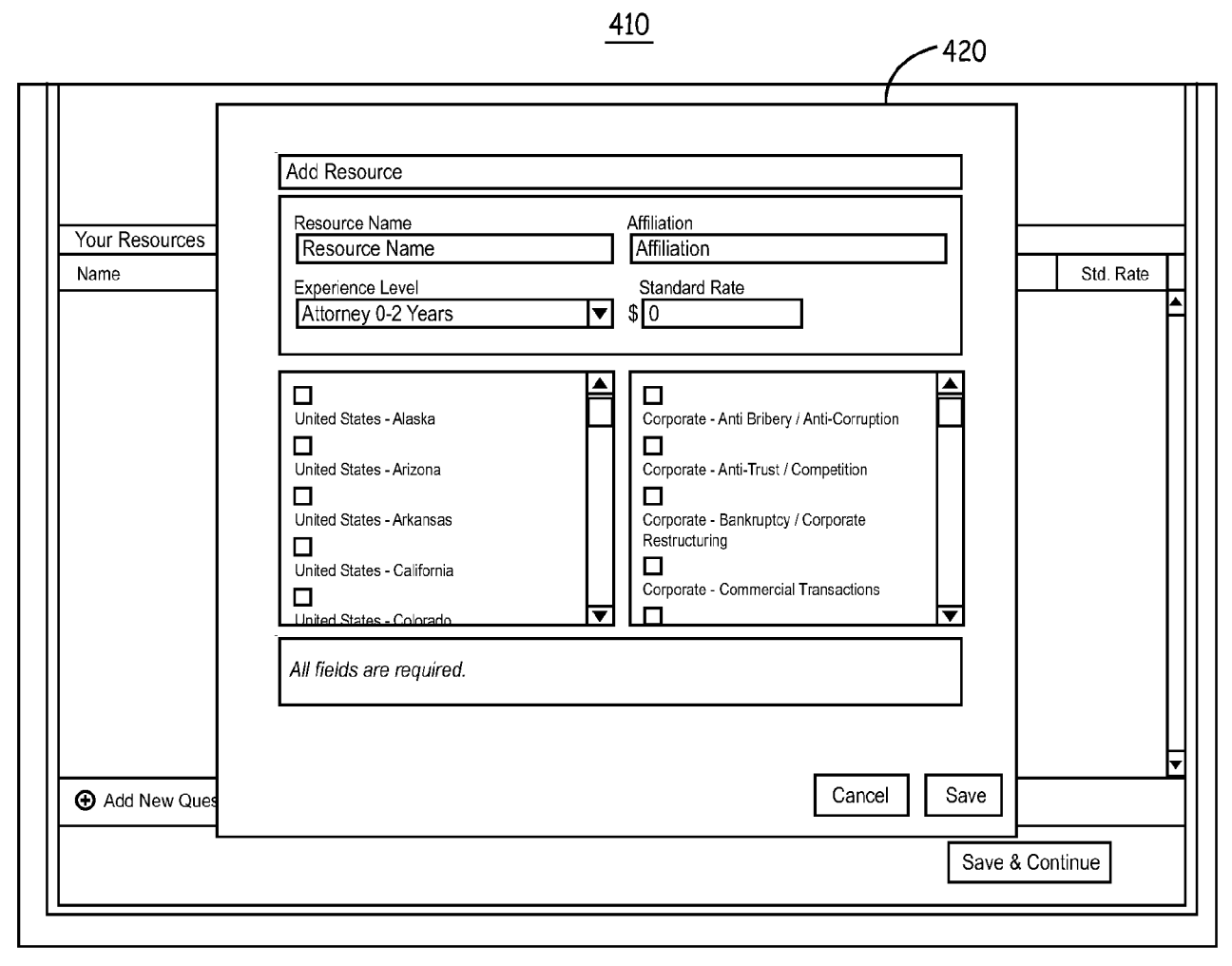
Figure 4I:
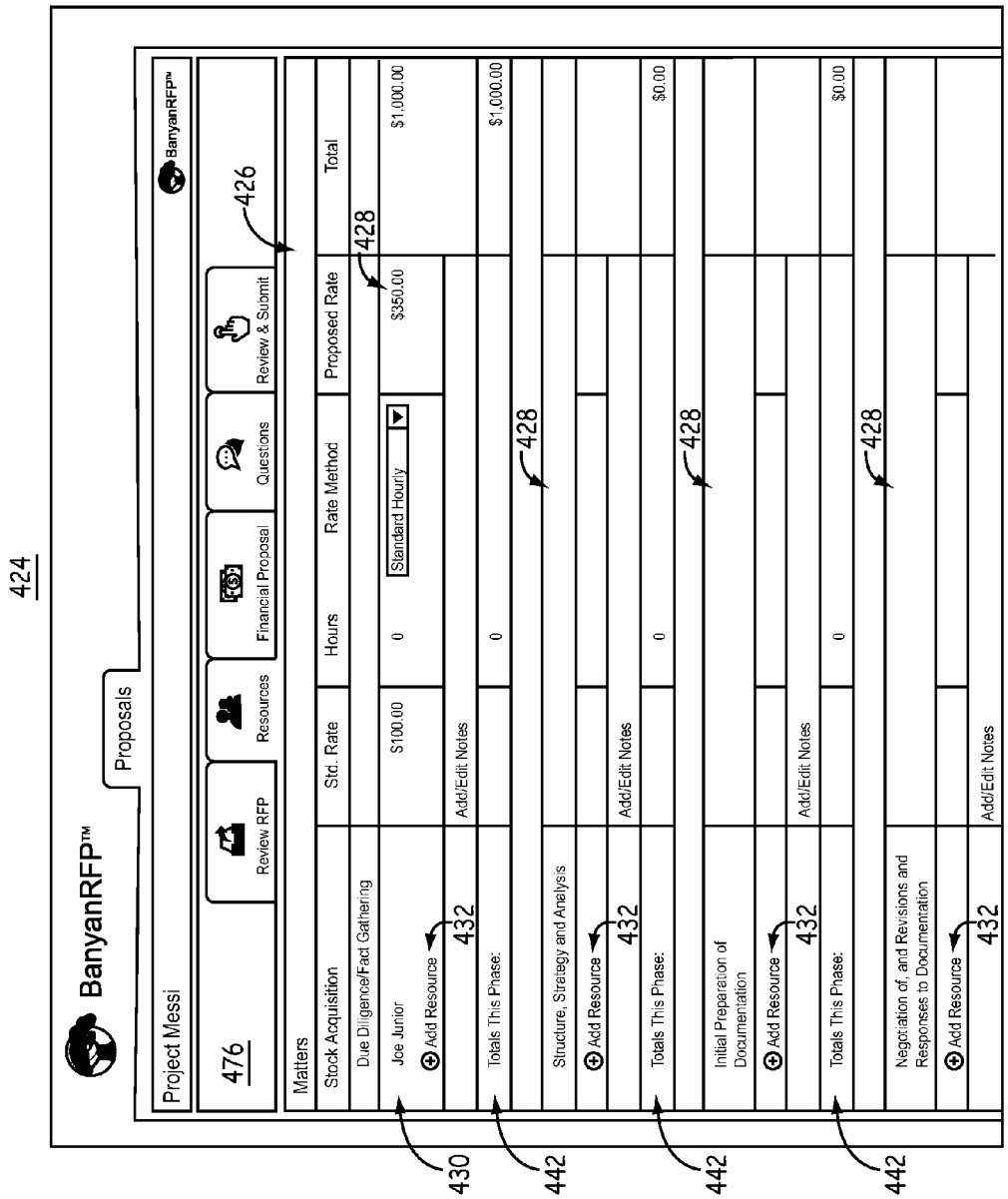

FIG. 4H shows how a line item 430 is added to the "Due Diligence/Fact Gathering" phase sub-section 428 of the "Stock Acquisition" matter section 426 after the bidder 132 clicks on the "Add Resource" button 432 associated with that phase sub-section 428. FIG. 4I shows the same line item 430 after the bidder 132 has selected "Joe Junior" for that line item 430, entered estimated 10 hours, and selected a billing method entity of "Standard Hourly."

Each phase sub-section 428 has associated phase totals 442 for the number of hours worked in that phase and the fees associated with that phase. Likewise, each matter section 426 has associated matter totals 444 for the number of hours worked in that matter and the fees associated with that matter.

Figure 4J:
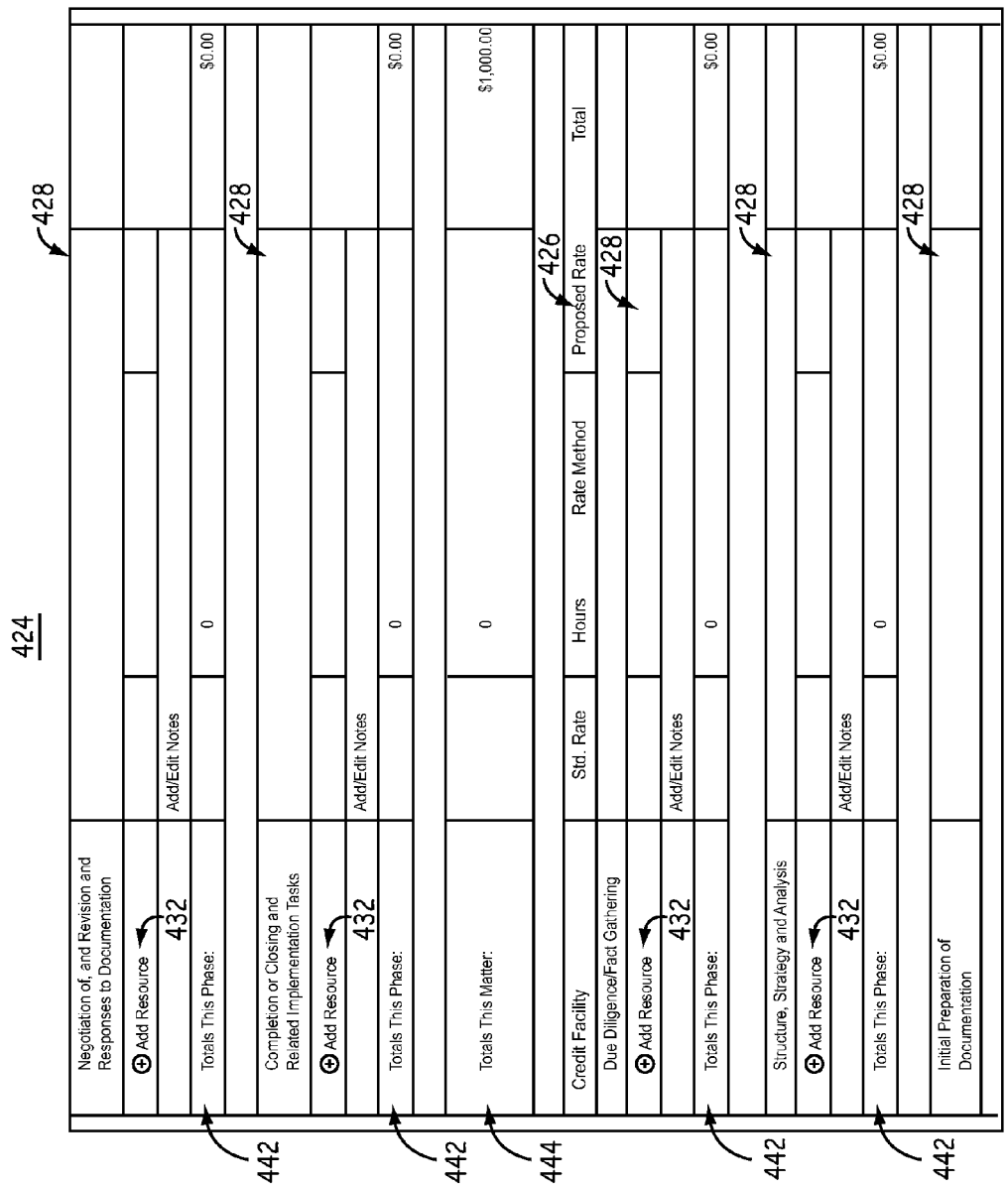
Figure 4K:
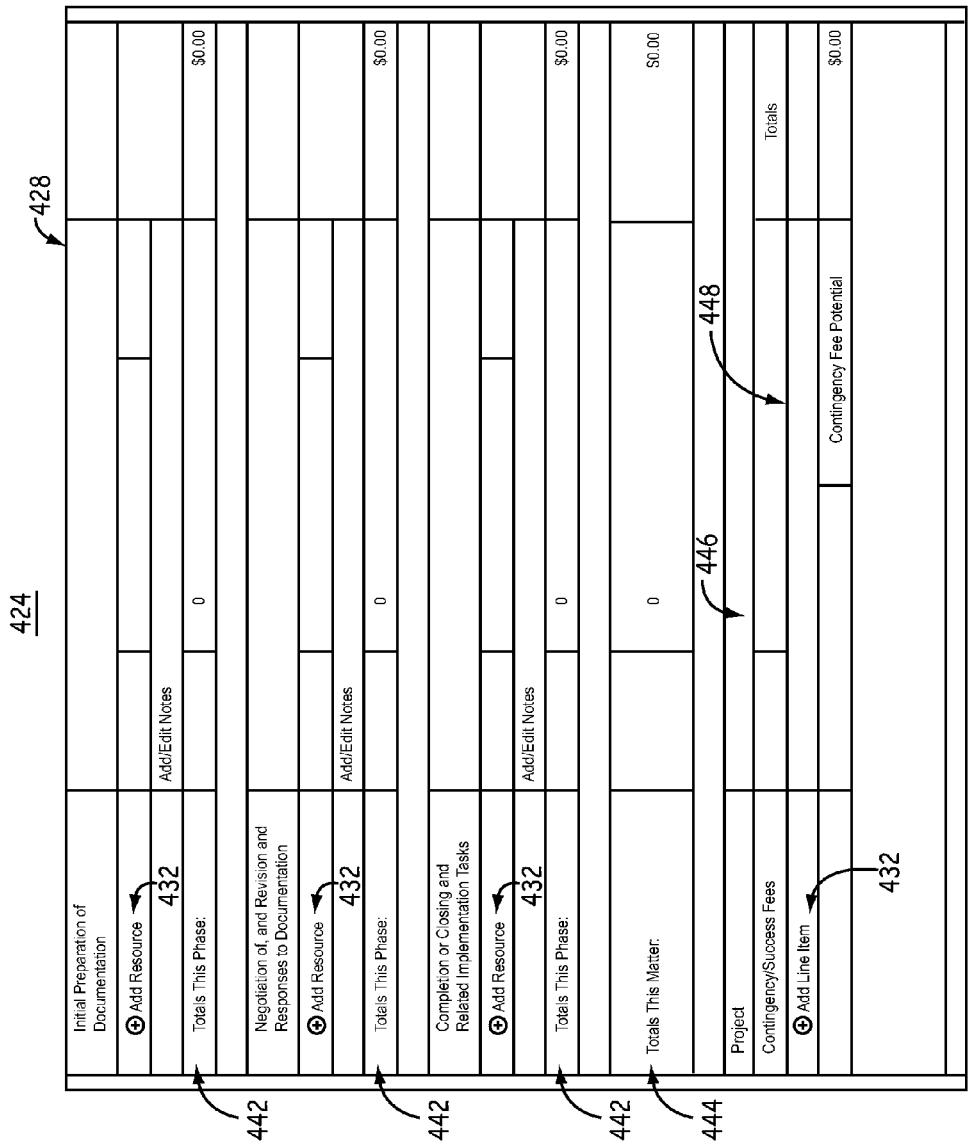
Figure 4L:
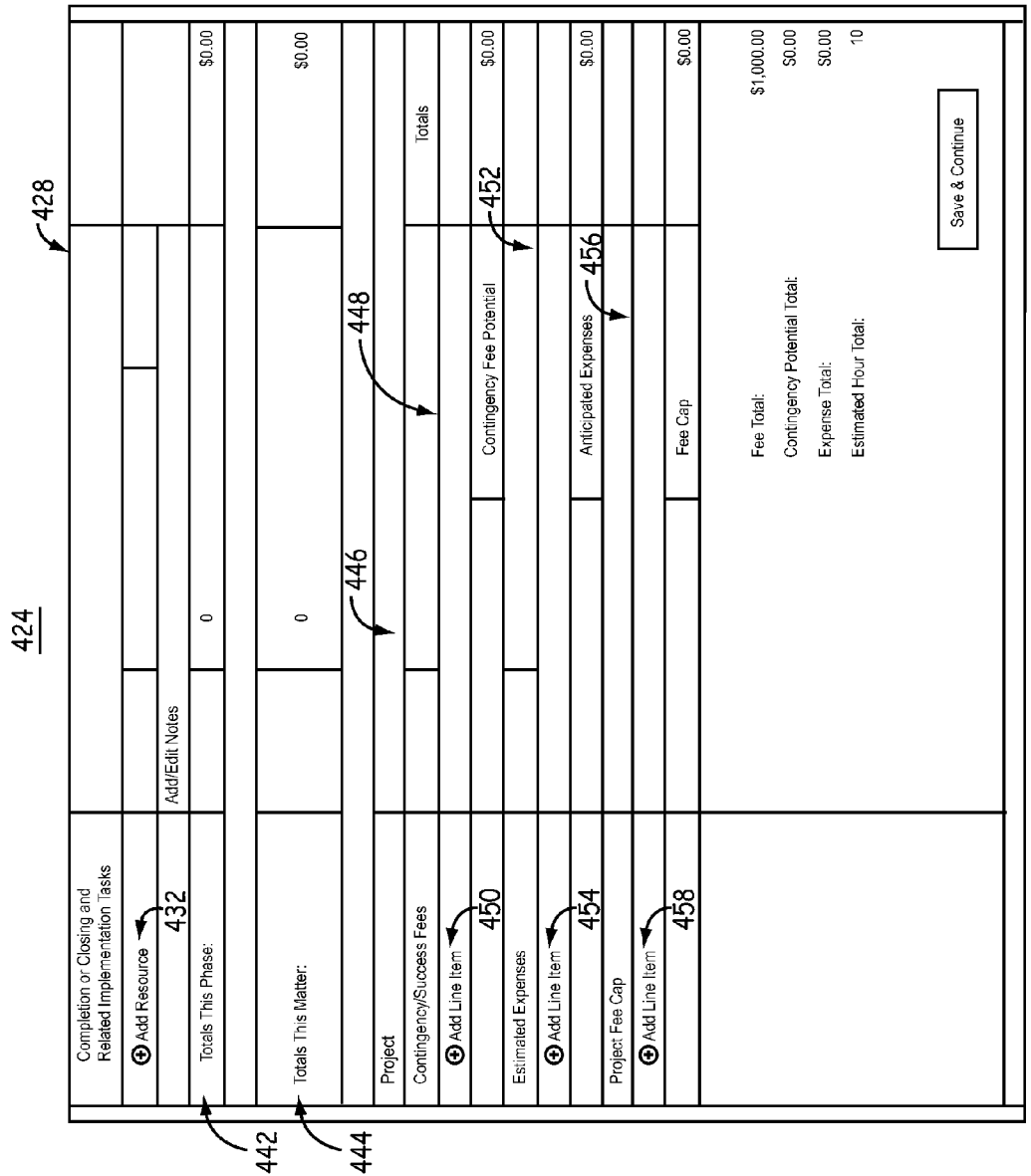

FIGS. 4J-4L show the rest of one example of the financial proposal page 424. FIG. 4J shows the financial proposal page 424 starting from the "Negotiation of, and Revision and Responses to Documentation" phase of the "Stock Acquisition" matter (which is also shown at the bottom of FIG. 4I) through the "Initial Preparation of Documentation" phase of the "Credit Facility" matter. FIG. 4K shows the financial proposal page 424 starting from the "Initial Preparation of Documentation" phase of the "Credit Facility" matter (which is also shown at the bottom of FIG. 4J) through the "Contingency/Success Fees" sub-section 448 (described below) of the "Project Section" section 446 (described below). FIG. 4L shows the financial proposal page 424 starting from the "Completion or Closing and Related Implementation Task" phase of the "Credit Facility" matter (which is also shown in FIG. 4K) through the end of the financial proposal page 424.

As shown in FIG. 4L, the financial proposal page 424 also includes a "Project" section 446. The "Project" section 446 includes a "Contingency/Success Fees" sub-section 448 in which the bidder 132 can specify any contingency or success fees that apply to any phase, matter, or the project as a whole. The "Contingency/Success Fees" sub-section 448 includes an "Add Line Item" button 450 that the bidder 132 can click on in order to add a line item to that sub-section 448 that provides information about a contingency or success fee. When the bidder 132 clicks on the "Add Line Item" button 450, an overlay (not shown) is displayed in which the bidder 132 can enter an amount for the contingency or success fee, a name for the contingency or success fee, and a description of the contingency or success fee (for example, a description of the triggering events, a description of how the fee is calculated, and/or an estimate of how much the fee could be).

The "Project" section 446 also includes an "Estimated Expenses" sub-section 452 in which the bidder 132 can specify any expenses that are estimated for any phase, matter, or the project as a whole. The "Estimated Expenses" sub-section 452 includes an "Add Line Item" button 454 that the bidder 132 can click on in order to add a line item to that sub-section 452 that specifies information about an estimated expense. When the bidder 132 clicks on the "Add Line Item" button 454, an overlay (not shown) is displayed in which the bidder 132 can enter an amount for the estimated expense, a name for the estimated expense, and a description of the estimated expense (for example, a description of any triggering event for the expense to be incurred, a description of how the expense is calculated, and/or an estimate of how much the expense could be).

The "Project" section 446 also includes a "Project Fee Cap" sub-section 456 in which the bidder 132 can specify any fee cap that applies to any phase, matter, or the project as a whole. The "Project Fee Cap" sub-section 456 includes an "Add Line Item" button 458 that the bidder 132 can click on in order to add a line item to that sub-section 456 that specifies information about a fee cap. When the bidder 132 clicks on the "Add Line Item" button 458, an overlay (not shown) is displayed in which the bidder 132 can enter an amount for the project fee cap, a name for the project fee cap, and a description of the project fee cap (for example, a description of any triggering event for the project fee cap and/or a description of how the project fee cap is calculated).

The bidder 132 can add a note to any line item displayed on the financial proposal page 424 by clicking on an "Add/Edit Note" button associated with the line item.

The billing method entities described above can be used to create a financial proposal 154 that implements many different kinds of fee schemes.

One example is a stepped fee structure in which the bidder 132 increases or decreases the rates it charges for some or all of its staff members after certain milestones occur (normally after a certain number of hours have been worked). For example, where a bidder 132 wishes to apply a reduced fee (discount) after a person has worked 100 hours on a given phase of the project, the bidder 132 can include two separate line items for that person for that phase. The first line item would be for the first 100 hours that person works and would use the standard hourly rate billing entity. The second line item would be for all hours worked by that person over the first 100 and would apply a billing entity that specifies an appropriate discounted billing method.

Another example is a contingency fee structure in which the bidder 132 would charge nothing or a nominal amount for its services unless a specific result is achieved. If the specific result is achieved the bidder 132 would then be paid for its services, typically at an amount which would be a premium to what it would have been paid if it had charged its standard hourly rates. In this case, any of the following billing method entities could be created and applied across the line items for the relevant matter or project—100% Discounted Hourly Rate, $0 Blended Hourly Rate, $0 Fixed Fee. Then, a line item would be added to the "Contingency/Success Fees" sub-section 448, and a note would be added to that line item explaining to which matter or the entire project the contingency fee line item applied.

Another example is a success fee structure in which the bidder 132 would charge for its services (often at some discount to its standard hourly rates) and would also receive an additional fee if a specific result is achieved. In this case, the standard hourly billing entity or an appropriate discounted hourly billing entity would be applied to the individual line items of the applicable matter or the entire project. Then, a line item would be added to the "Contingency/Success Fees" sub-section 448, and a note would be added to that line item explaining to which phase, matter, or the entire project the success fee line item applied Another example is a retainer fee structure in which the bidder 132 would receive a fixed fee prior to the performance of services within pre-defined parameters. Typically this fee arrangement is associated with particular matters or an entire project that are consultory in nature (as opposed to a transaction or dispute). A fixed fee billing method entity would be created and applied to all the line items in the applicable matter or the entire project. In the add/edit notes section for the matter or project, a note would be included that indicates that the fixed fee is to be paid as a retainer and would indicate any special conditions for the retainer (for example, if hours more than estimated are worked the customer 128 would begin to pay using the bidder's standard hourly rates, etc.).

Another example is a fee cap structure in which the bidder 132 agrees to cap the fees it can receive for a particular phase, matter or an entire project. In this case, as noted above, a fee cap line item would be added to the "Project Fee Cap" sub-section 456, and a note would be added to that line item explaining to which phase, matter, or the entire project the fee cap line item applied.

As shown in FIG. 4L, the lower portion of the financial proposal page 424 also includes a "Save & Continue" button 460 that the bidder 132 can click on when the bidder 132 is done entering its financial proposal 154. Clicking on button 460 causes the RFP website 104 to save the bidder's financial proposal 154 in the database 162 and causes the RFP website 104 to move on to responding to the questions 147 that the customer 128 has included in the RFP.

Figure 4M:
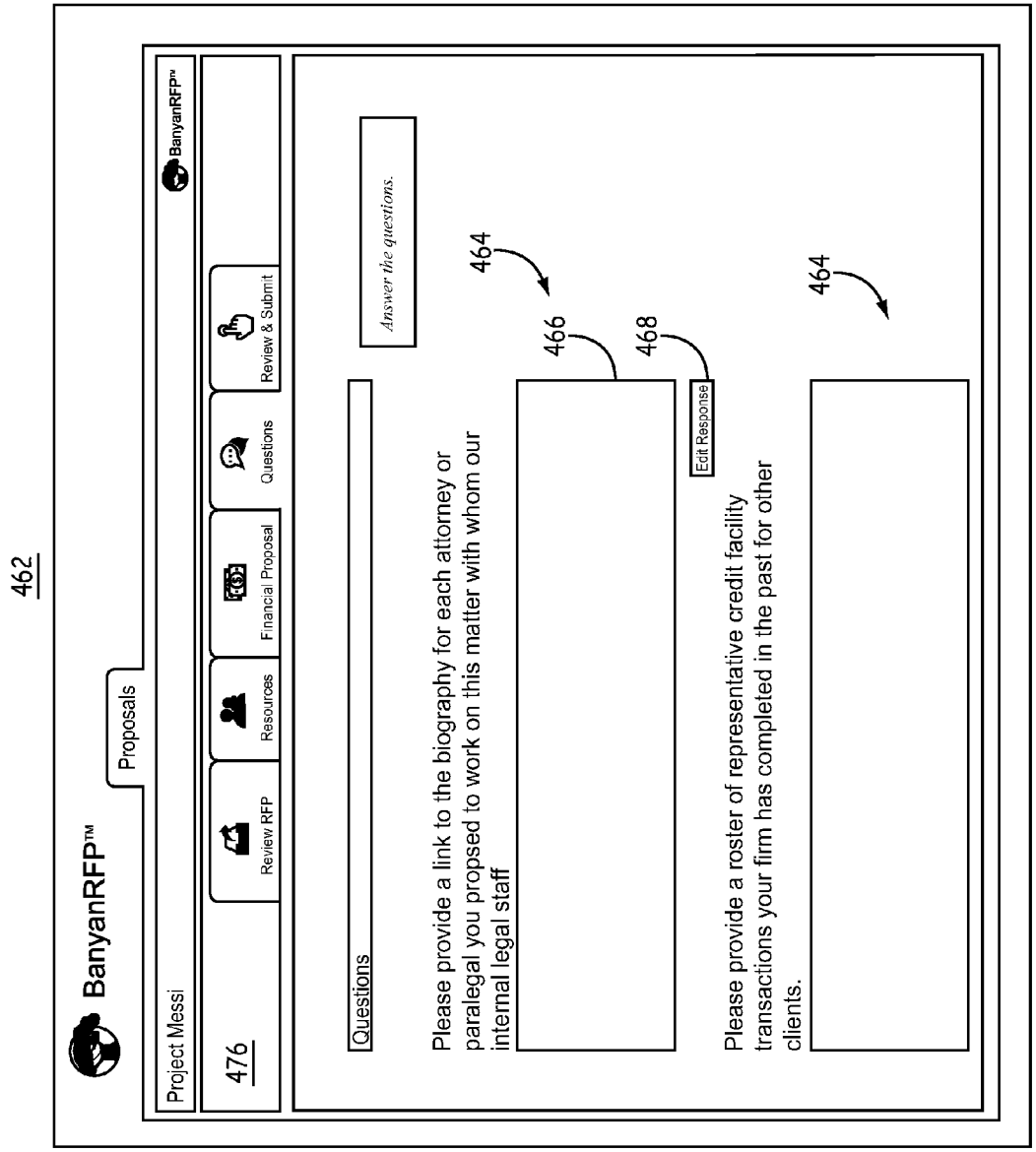

In this example, the RFP website 104 is configured to display a page 462 (shown in FIGS. 4M-4N) that the bidder 132 can use to enter its responses 156 to the questions 147 the customer 128 included in the RFP. This page 462 is also referred to here as the "questions" page 462. FIG. 4M shows the upper portion of the questions page 462, and FIG. 4N shows the lower portion of the questions page 462.

The questions page 462 includes a separate section 464 for each question 147 included in the RFP. Each section 464 presents the question or information request that is being asked or made by the customer 128. Each section 464 includes a text box 466. Each text box 466 has an associated button 468 that the bidder 132 can click on in order to enter a response to the question 147 in the text box 466, in which case the label associated with the button 468 changes from "Edit Response" to "Save Changes". After the bidder 132 is done entering a response, the bidder 132 can click on the button 468 to save the response.

Figure 4N:
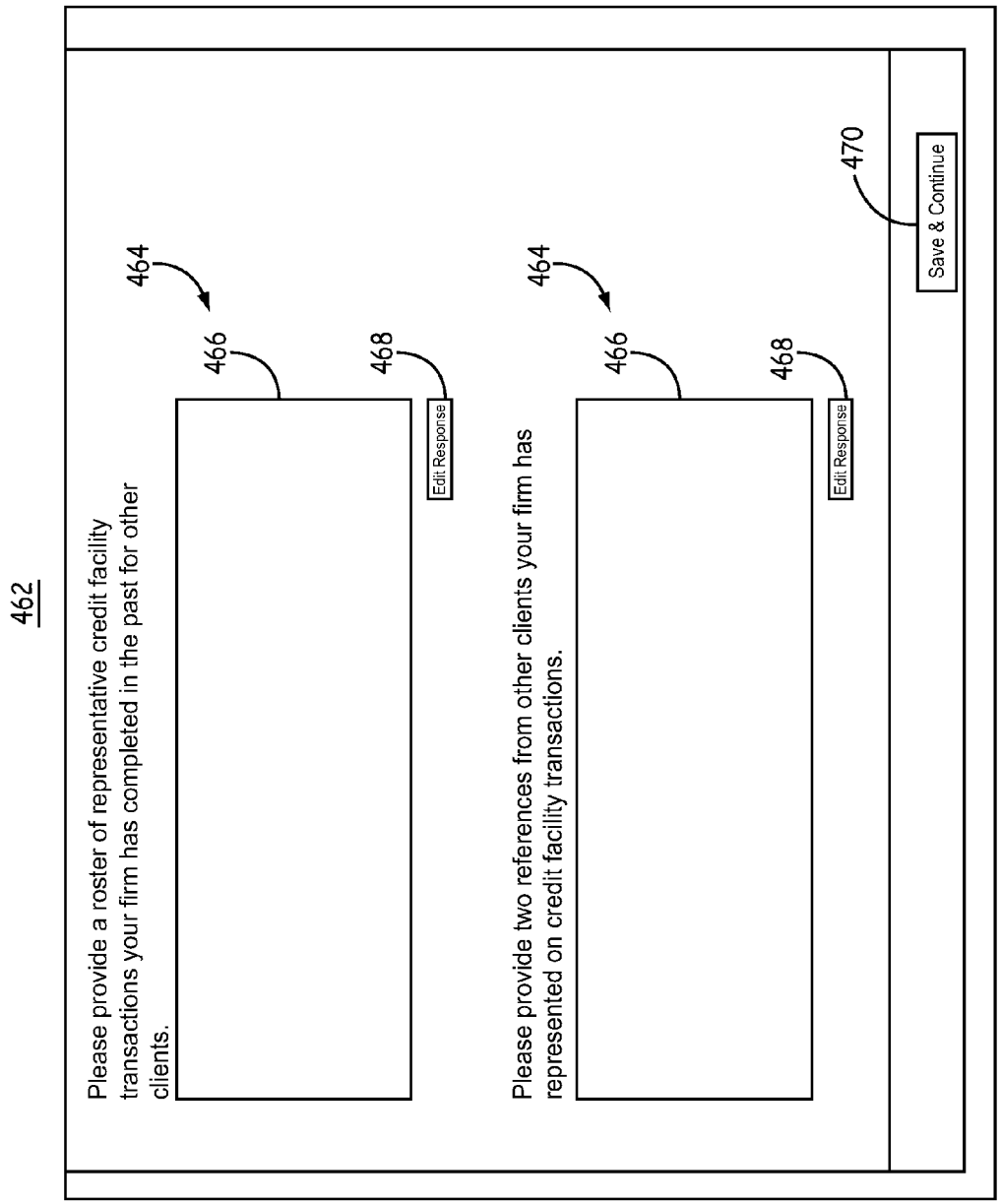
Figure 40:
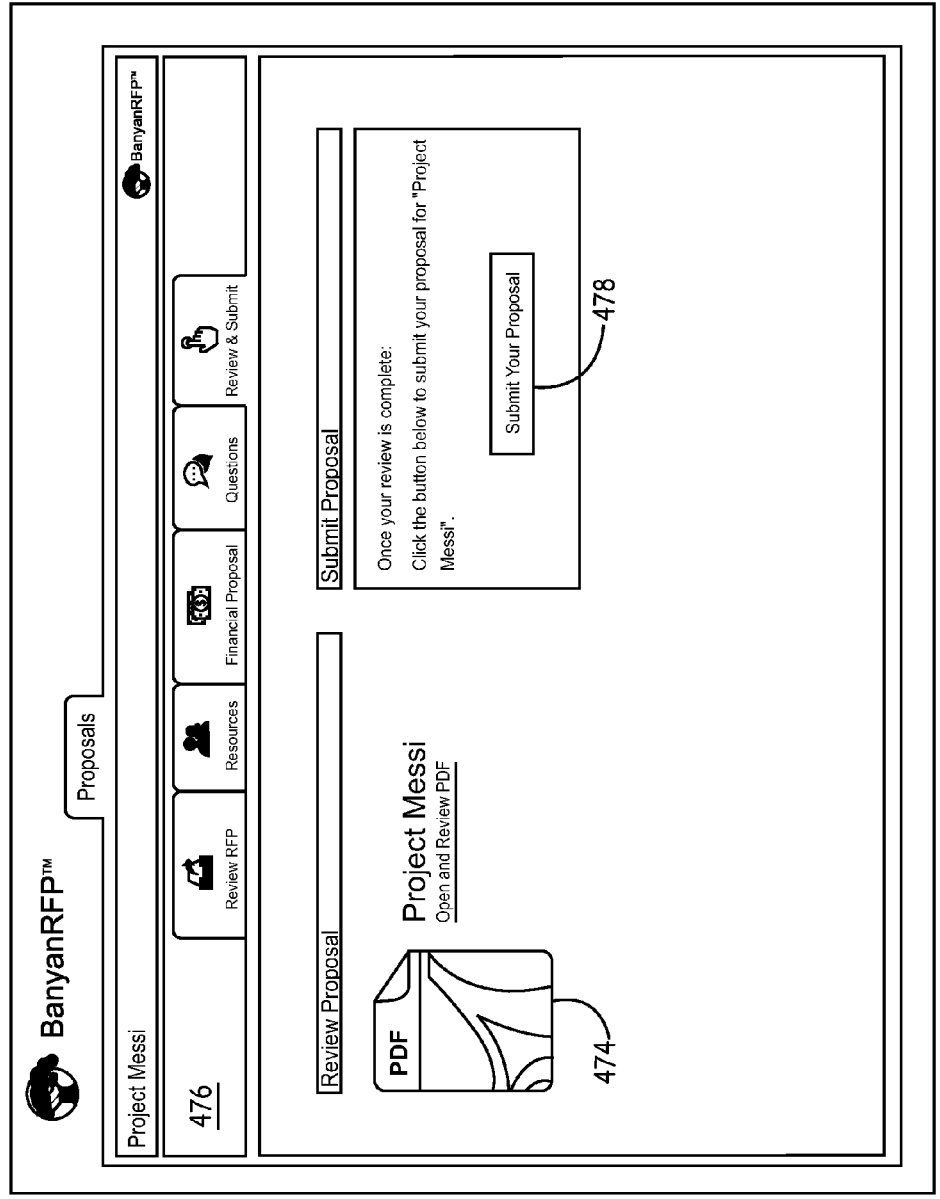

As shown in FIG. 4N, the lower portion of the questions page 462 also includes a "Save & Continue" button 470 that the bidder 132 can click on when the bidder 132 is done entering its responses 156 to the customer's questions 147. Clicking on button 470 causes the RFP website 104 to save the bidder's responses 156 in the database 162 and causes the RFP website 104 to generate the proposal document 143 from the bidder's proposal information 144 and move on to a page where the bidder 132 can review the generated proposal document 143.

In this example, the RFP website 104 is configured to display a page 472 (shown in FIG. 4O) that the bidder 132 can use to review the proposal document 143 that is generated for the project from the bidder's current proposal information 144 and to submit the bidder's proposal to the customer 128. This page 472 is also referred to here as the "review and submit" page 472.

As shown in FIG. 4O, the review and submit page 472 includes a button 474 that the bidder 132 can click on in order to display the proposal document 143 that has been generated from the bidder's current proposal information 144. If after reviewing the proposal document 143, the bidder 132 wishes to change some of its proposal information 144, the bidder 132 can return to the appropriate page and edit that proposal information 144. Then, the bidder 132 can save the updated proposal information 144 (for example, by clicking the appropriate "Save & Continue" button), after which the RFP website 104 will generate an updated proposal document 143 that reflects the bidder's updated proposal information 144. The bidder 132 can then return to the review and submit page 472 to review the updated proposal document 143 and further edit any proposal information 144. Also, in some implementations, the particular set of comparative metrics that the customer 128 has selected for its viewing and/or for the viewing of the other bidders 132 is also generated from the bidder's 132 current proposal information 144 and one or more pages (not shown) are provided for the bidder 132 to review the selected comparative metrics in the same summary or dashboard view that the customer 128 and/or the other bidders' 132 will view them in.

The various pages described here in connection with FIGS. 4A-4O include a navigation section 476 that includes a respective tab for each of the pages described above in connection with FIGS. 4A-4O. The bidder 132 can cause the RFP website 104 to display a particular page by clicking on the appropriate tab in the navigation section 476.

The review and submit page 472 also includes a "Submit Proposal" button 478. When the bidder 132 has finished reviewing its proposal document 143 and revising its proposal information 144 for the RFP, the bidder 132 can click on the "Submit Proposal" button 478 in order to submit its proposal 144 for the RFP to the customer 128.

In the exemplary embodiment described above in connection with FIGS. 3A-3Q and 4A-4O, several of the pages make use of a combined "Save & Continue" button. It is to be understood however that the function of saving and the function of continuing can be assigned, respectively, to a separate "Save" button and a separate "Continue" button.

One exemplary embodiment has been described above in connection with FIGS. 1, 2A-2B, 3A-3Q, and 4A-4O. It is to be understood, however, that other embodiments can be implemented in other ways. For example, in some embodiments, the RFP website 104 is configured to enable the customer 128 to define a respective finite set of proper responses for at least some of the questions, information requests, or other elements the customer 128 is requesting be answered or provided as a part of bidder's proposal 144.

These questions, requests, or other elements are referred to here as "constrained questions." The RFP website 104 is also configured to enable the customer 128 to specify for each constrained question a permissible number of the possible valid responses that a bidder 132 may select in response to that constrained question (for example, only a single item or one or more items). The RFP website 104 is configured to enable the customer 128 to optionally identify one or more of the finite set of proper responses as "preferred" responses to the associated constrained question. The customer 128 can also optionally specify that the bidder 132, upon selecting a response other than one of the preferred responses, be presented with a text field into which a bidder 132 enters (and from which the RFP website 104 receives) "free form" text that may also provide details or an explanation about why a preferred response was not selected. The RFP website 104 also may be configured to include, or to enable the customer 128 to optionally include, as one of the finite set of proper responses an "other" or "not applicable" response. The customer 128 can also optionally specify that the bidder 132, upon selecting "other" or "not applicable" as a response to a constrained question, be presented with a text field into which a bidder 132 enters (and from which the RFP website 104 receives) free form text that may also provide details or an explanation about why the "other" or "not applicable" response was selected. By forcing (or at least encouraging) bidders 132 to provide proper or preferred responses (or a proper number of responses) to constrained questions, it should be easier to perform an "apples-to-apples" comparison of responses to constrained questions from different bidders 132.

Moreover, the RFP website 104 can be configured to enable the customer 128 to specify whether a given information request or element of the fee proposal spreadsheet framework 146 must be responded to by each bidder 132 (referred to here as "mandatory questions") or whether the information request or element is optional and need not be responded to by each bidder 132 (referred to here as "optional questions"). The RFP website 104 can be configured to prevent a bidder 132 from submitting a proposal in response to an RFP unless all of the mandatory questions have been responded to. The RFP website 104 can be configured to permit a bidder 132 to submit a proposal in response to an RFP even if some optional questions have not been responded to.

Furthermore, the RFP website 104 can be extended or modified to function as a project tracking tool. For example, in one usage scenario, a bidder uses the RFP website to prepare a financial proposal of the type described above. The pages used for entering the financial proposal can be extended to include additional fields or columns to show "actual" numbers for each of the line items specified in the financial proposal as well as actual numbers for the phase, matter, and project totals. That is, for each line item in the financial proposal, a corresponding actual number of hours worked by the associated resource and/or the actual fees billed for that line item can be captured and displayed for the bidder to track the bidder's performance in performing work on the project. Actual numbers for the phase, matter, and project totals can be calculated from the actual numbers for the line items. Actual numbers for expenses, contingency/success fees, and project caps can also be captured and displayed using the website.

This "actual" data can be captured electronically (for example, by importing billing data directly from the service provider's billing software) and/or can be manually entered (for example, by making such "actual" data fields editable).

With such a modified system, the website can be used solely as a project tracking tool by a service provider, in which case the website would not be used for managing an RFP process, but solely for the service provider's benefit as a project tracking tool.

The summary table used to display comparative metrics from each bidder 132 can be implemented in many ways. For example, in one implementation such a summary table comprises a column for each service provider and the rows specify a particular comparative metric or answer to a constrained or unconstrained question. For each constrained question where only one of the finite set of possible valid responses specified for that question can be selected by a bidder 132, the selected response for each bidder 132 can be displayed in a single row that is associated with that question under the that bidder's column.

Such an approach can also be used where more than one of the finite set of possible valid responses specified for that question can be selected by a bidder 132, in which case all of the selected responses can be displayed in a single row associated with that question.

Alternatively, for each constrained question, a separate row can be included in the summary table for each of the possible valid responses that is associated with that constrained question, in which whether each bidder 132 has selected each particular response can be indicated by inserting an "X" (or "Yes" or "No") into the separate row associated with that response under that bidder's column.

Also, for each unconstrained question, the free form text entered by each bidder 132 can be displayed in a single row that is associated with that unconstrained question under that bidder's column. The summary table that is generated for the customer 128 to view is also referred to here as the "customer's summary table" or "customer's dashboard", and the summary table that is generated for the bidders 132 to view is also referred to here as the "bidders' summary table" or "bidder's dashboard". As noted above, the customer's summary table or dashboard can, and will likely, be different from the bidder's summary table or dashboard.

Embodiments of the system 100 described above may have one or more of the following advantages over manual RFP-management processes. Because the bidders 132 prepare their proposals 144 using the RFP website 104, the RFP website 104 is able to control the format of each bidder's proposal 144 and should therefore be able to present the proposals 144 to the customer 128 in a more unified manner. Because all the proposals 144 are gathered into the centralized database 162, a wide range of comparative metrics can be compared among the different proposals 144 automatically by the customer 128. This enables faster and more in-depth comparative analysis of the proposals 144. Also, manual RFP-management processes typically provide no centralized mechanism for questions to be asked and answered about the RFP. In many instances a question asked by one bidder 132 would benefit the process if it could be answered for all bidders 132. As noted above, embodiments of the RFP website 104 described above provide such a mechanism for bidders 132 to ask questions and the customer 128 to answer the questions for one or more of the bidders 132 in a convenient and centralized manner. Moreover, by providing real-time information on the status of, and comparative metrics relating to, competing proposals 144, the RFP website 104 provides additional incentives for the bidders 132 to update their proposals 144 with more competitive terms.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A computer-implemented method of performing online competitive bidding by a plurality of active bidders that bid to provide professional services to a customer, the method performed using at least one server hosting an online competitive bidding system, a customer client device used by the customer, and a plurality of bidder client devices, each of the plurality of active bidders using a respective bidder client device, the method comprising:

transmitting from the server to the each of the bidder client devices a respective one or more bidder pages operable to cause the respective bidder client device to display, on a respective display device, a bidder user interface for the online competitive bidding system, wherein the bidder user interface is configured to cause the respective bidder client device to receive information related to a proposal by the respective active bidder to provide the professional services to the customer and to submit the respective proposal;

receiving, at the server from the bidder client devices, the information related to each of the proposals submitted by the active bidders;

transmitting from the server to the customer client device one or more customer pages operable to cause the customer client device to display, on a respective display device, a customer user interface for the online competitive bidding system, wherein the customer user interface is configured to cause the customer client device to receive from the customer an input indicating whether the online competitive bidding system is to disclose to each of the active bidders a respective detailed comparative metric other than total project price for each of the proposals submitted by all of the other active bidders, wherein the respective detailed comparative metric other than total project price for each of the proposals submitted by all of the other active bidders is a function of financial information included in the respective proposal;

receiving, by the server, the input indicating whether the online competitive bidding system is to disclose to each of the active bidders the respective detailed comparative metric other than total project price for each of the proposals submitted by all of the other active bidders; and determining, by the server, the respective detailed comparative metric for each of the proposals submitted by all of the active bidders;

in response to receiving the input indicating that the online competitive bidding system is to disclose to each of the active bidders the respective detailed comparative metric other than total project price for each of the proposals submitted by all of the other active bidders:

for each of the active bidders, transmitting, from the server to the bidder client device used by that active bidder, the respective detailed comparative metric other than total project price for each of the proposals submitted by all of the other active bidders; and wherein the bidder user interface is further operable to cause the respective bidder client device to display, on the display device associated with the respective bidder client device and the respective active bidder, the respective detailed comparative metric other than total project price for each of the proposals submitted by all of the other active bidders;

wherein the bidder user interface causes the respective bidder client device to receive updated information related to the proposal by the respective active bidder in response to the displaying of the respective detailed comparative metric other than total project price for each of the proposals submitted by all of the other active bidders and to submit the respective proposal with the updated information; and wherein the bidder user interface, in response to receiving the respective updated information related to the respective proposal by the respective active bidder, causes the respective bidder client device to display, on the display device associated with the respective bidder client device and with the respective active bidder and prior to the respective proposal with the respective updated information being submitted, a respective updated detailed comparative metric other than total project price for the respective proposal of the respective active bidder that reflects the respective updated information related to the respective proposal by the respective active bidder.

2. The method of claim 1, wherein the customer user interface is configured to cause the customer client device to receive from the customer an input indicating whether the online competitive bidding system is to dynamically disclose to each of the active bidders a respective updated detailed comparative metric other than total project price for each of the proposals submitted by all of the other active bidders that reflects the respective updated information supplied by each of the other active bidders;

wherein the method further comprises:
receiving, by the server, the input indicating whether the online competitive bidding system is to dynamically disclose to each of the active bidders the respective updated detailed comparative metric other than total project price for each of the proposals submitted by all of the other active bidders that reflects the respective updated information supplied by each of the other active bidders; and in response to the input indicating that the online competitive bidding system is to dynamically disclose to each of the active bidders the respective updated detailed comparative metric other than total project price for each of the proposals submitted by all of the other active bidders that reflects the respective updated information supplied by each of the other active bidders:
determining, by the server, the respective updated detailed comparative metric other than total project price for each of the proposals of all of the active bidders that reflects the respective updated information supplied by each of the active bidders; and
for each of the active bidders, transmitting from the server to the bidder client device used by that active bidder, the respective updated detailed comparative metric other than total project price for each of the proposals of all of the other active bidders that reflects the respective updated information supplied by each of the other active bidders; and wherein the bidder user interface is further operable to cause the respective bidder client device to display, on the display device associated with the respective bidder client device, the respective updated detailed comparative metric other than total project price for each of the proposals submitted by all of the other active bidders.

3. The method of claim 1, wherein the server comprises a plurality of servers.

4. The method of claim 1, wherein the customer user interface is configured to cause the customer client device to receive from the customer an input indicating whether the online competitive bidding system is to disclose to each of the active bidders the respective total project price for each of the proposals submitted by all of the other active bidders;

wherein the method further comprises:
receiving, by the server, the input indicating whether the online competitive bidding system is to disclose to each of the active bidders the respective total project price for each of the proposals submitted by all of the other active bidders;

in response to the input indicating that the online competitive bidding system is to disclose to each of the active bidders the respective total project price for each of the proposals submitted by all of the other active bidders:
determining, by the server, the respective total project price for each of the proposals of all of the active bidders; and
for each of the active bidders, transmitting from the server to the bidder client device used by that active bidder, the respective total project price for each of the proposals of all of the other active bidders; and wherein the bidder user interface is further operable to cause the respective bidder client device to display, on the display device associated with the respective bidder client device, the respective total project price for each of the proposals submitted by all of the other active bidders.

5. The method of claim 1, wherein the customer user interface is configured to cause the customer client device to receive, from the customer, information about at least one of the following:
a project associated with providing the professional services;
at least one matter that is a part of the project;
one or more phases of the matter;
expectations of the customer about how bidders will staff the matter;
one or more preferred resources to be used in staffing the matter;
questions to be answered by bidders; and
one or more proposal parameters.

6. The method of claim 1, wherein the customer user interface is configured to cause the customer client device to receive from the customer information identifying a finite set of possible valid responses to a question to be presented to the active bidders and a prompt related to the question to be presented to the active bidders that enables the active bidders to select from the finite set of possible valid responses in connection with responding to the question.

7. An online competitive bidding system for performing online competitive bidding by a plurality of active bidders that bid to provide professional services to a customer, the system comprising:
at least one programmable processor to execute software;
at least one network interface to communicatively couple the system, using a communication network, to a customer client device used by the customer and a plurality of bidder client devices, each of the plurality of active bidders using a respective bidder client device;
wherein the system is coupled to at least one storage device to store information related to the online competitive bidding; and
wherein the software, when executed by the programmable processor, is operable to cause the system to:
transmit to the each of the bidder client devices a respective one or more bidder pages operable to cause the respective bidder client device to display, on a respective display device, a bidder user interface for the online competitive bidding system, wherein the bidder user interface is configured to cause the respective bidder client device to receive information related to a proposal by the respective active bidder to provide the professional services to the customer and to submit the respective proposal;

receive, from the bidder client devices, the information related to the proposals submitted by the active bidders to provide the professional services to the customer;

transmit to the customer client device one or more customer pages operable to cause the customer client device to display, on a respective display device, a customer user interface for the online competitive bidding system, wherein the customer user interface is configured to cause the customer client device to receive from the customer an input indicating whether the online competitive bidding system is to disclose to each of the active bidders a respective detailed comparative metric other than total project price for each of the proposals submitted by all of the other active bidders, wherein the respective detailed comparative metric other than total project price for each of the proposals submitted by all of the other active bidders is a function of financial information included in the respective proposal;

receive the input indicating whether the online competitive bidding system is to disclose to each of the active bidders the respective detailed comparative metric other than total project price for each of the proposals submitted by all of the other active bidders;

determine the respective detailed comparative metric other than total project price for each of the proposals submitted by all of the active bidders; and in response to the input indicating that the online competitive bidding system is to disclose to each of the active bidders the respective detailed comparative metric other than total project price for each of the proposals submitted by all of the other active bidders: for each of the active bidders, transmit to the bidder client device used by that active bidder, the respective detailed comparative metric other than total project price for each of the proposals submitted by all of the other active bidders; and wherein the bidder user interface is further operable to display, on the display device associated with the respective bidder client device, the respective detailed comparative metric other than total project price for each of the proposals submitted by all of the other active bidders;

wherein the bidder user interface is configured to cause the respective bidder client device to receive updated information related to the proposal by the respective active bidder in response to the displaying of the respective detailed comparative metric other than total project price for each of the proposals submitted by all of the other active bidders and to submit the respective proposal with the updated information; and wherein the bidder user interface is configured to, in response to receiving the respective updated information related to the respective proposal by the respective active bidder, cause the respective bidder client device to display, on the display device associated with the respective bidder client device and with the respective active bidder and prior to the respective proposal with the respective updated information being submitted, a respective updated detailed comparative metric other than total project price for the respective proposal of the respective active bidder that reflects the respective updated information related to the respective proposal by the respective active bidder.

8. The system of claim 7, wherein the customer user interface is configured to receive from the customer an input indicating whether the online competitive bidding system is to dynamically disclose to each of the active bidders a respective updated detailed comparative metric other than total project price for each of the proposals submitted by all of the other active bidders that reflects the respective updated information supplied by each of the other active bidders;

wherein the software, when executed by the programmable processor, is further operable to cause the system to:

receive the input indicating whether the online competitive bidding system is to dynamically disclose to each of the active bidders the respective updated detailed comparative metric other than total project price for each of the proposals submitted by all of the other active bidders that reflects the respective updated information supplied by each of the other active bidders; and in response to the input indicating that the online competitive bidding system is to dynamically disclose to each of the active bidders the respective updated detailed comparative metric other than total project price for each of the proposals submitted by all of the other active bidders that reflects the respective updated information supplied by each of the other active bidders:

determine the respective updated detailed comparative metric for each of the proposals of all of the active bidders that reflects the respective updated information supplied by each of the active bidders; and for each of the active bidders, transmit to the bidder client device used by that active bidder, the respective updated detailed comparative metric other than total project price for each of the proposals of all of the other active bidders that reflects the respective updated information supplied by each of the other active bidders; and wherein the bidder user interface is further operable to display, on the display device associated with the respective bidder client device, the respective updated detailed comparative metric other than total project price for each of the proposals submitted by all of the other active bidders.

9. The system of claim 7, wherein the system comprises a plurality of programmable processors.

10. The system of claim 7, wherein the customer user interface is configured to receive from the customer an input indicating whether the online competitive bidding system is to disclose to each of the active bidders the respective total project price for each of the proposals submitted by all of the other active bidders;

wherein the software, when executed by the programmable processor, is further operable to cause the system to:

receive the input indicating whether the online competitive bidding system is to disclose to each of the active bidders the respective total project price for each of the proposals submitted by all of the other active bidders;

in response to the input indicating that the online competitive bidding system is to disclose to each of the active bidders the respective total project price for each of the proposals submitted by all of the other active bidders, determine the respective total project price for each of the proposals of all of the active bidders; and for each of the active bidders, transmit to the bidder client device used by that active bidder, the respective total project price for each of the proposals of all of the other active bidders; and wherein the bidder user interface is further operable to display, on the display device associated with the respective bidder client device, the respective total project price for each of the proposals submitted by all of the other active bidders.

11. The system of claim 7, wherein the customer user interface is configured to receive from the customer information about at least one of the following:

a project associated with providing the professional services;

at least one matter that is a part of the project;

one or more phases of the matter;

expectations of the customer about how bidders will staff the matter;

one or more preferred resources to be used in staffing the matter;

questions to be answered by bidders; and one or more proposal parameters.

12. The system of claim 7, wherein the customer user interface is configured to receive from the customer information identifying a finite set of possible valid responses to a question to be presented to the active bidders and a prompt related to the question to be presented to the active bidders that enables the active bidders to select from the finite set of possible valid responses in connection with responding to the question.

13. A computer-implemented method of performing online competitive bidding by a plurality of active bidders that bid to provide professional services to a customer, the method performed using at least one server hosting an online competitive bidding system, a customer client device used by the customer, and a plurality of bidder client devices, each of the plurality of active bidders using a respective bidder client device, the method comprising:

transmitting from the server to the each of the bidder client devices a respective one or more bidder pages operable to cause the respective bidder client device to display, on a respective display device, a bidder user interface for the online competitive bidding system, wherein the bidder user interface is configured to cause the respective bidder client device to receive information related to a proposal by the respective active bidder to provide the professional services to the customer;

receiving, at the server from the bidder client devices, the information related to the proposals by the active bidders to provide the professional services to the customer;

transmitting from the server to the customer client device one or more customer pages operable to cause the customer client device to display, on a respective display device, a customer user interface for the online competitive bidding system, wherein the customer user interface is configured to cause the customer client device to receive from the customer an input indicating whether the online competitive bidding system is to disclose to each of the active bidders a respective comparative metric for each of the proposals submitted by all of the other active bidders during one or more first phases of bidding and to not disclose to each of the active bidders the respective comparative metric for each of the proposals submitted by all of the other active bidders during one or more second phases of bidding, wherein the respective comparative metric for each of the proposals submitted by all of the other active bidders is a function of financial information included in the respective proposal;

receiving, by the server, the input indicating that the online competitive bidding system is to disclose to each of the active bidders the respective comparative metric for each of the proposals submitted by all of the other active bidders during one or more first phases of bidding and to not disclose to each of the active bidders the comparative metric for each of the proposals submitted by all of the other active bidders during one or more second phases of bidding; and in response to the input indicating that the online competitive bidding system is to disclose to each of the active bidders the respective comparative metric for each of the proposals submitted by all of the other active bidders during one or more first phases of bidding and to not disclose to each of the active bidders the respective comparative metric for each of the proposals submitted by all of the other active bidders during one or more second phases of bidding:

during the one or more first phases of the bidding:

determining, by the server, the respective comparative metric for the each of the proposals of all of the active bidders; and for each of the active bidders, transmitting from the server to the bidder client device used by that active bidder, the respective comparative metric for each of the proposals of all of the other active bidders; and wherein the bidder user interface is further operable to cause the respective bidder client device to display for the respective active bidder, on the display device associated with the respective bidder client device, the respective comparative metric for each of the proposals submitted by all of the other active bidders during the one or more first phases of the bidding and not display for the respective active bidder, on the display device associated with the respective bidder client device, the respective comparative metric for each of the proposals of all of the other active bidders during the one or more second phases of the bidding;

wherein the bidder user interface causes the respective bidder client device to receive updated information related to the proposal by the respective active bidder in response to the displaying of the respective comparative metric for each of the proposals submitted by all of the active bidders; and wherein the bidder user interface, in response to receiving the respective updated information related to the respective proposal by the respective active bidder, causes the respective bidder client device to display, on the display device associated with the respective bidder client device and with the respective active bidder and prior to the respective proposal with the respective updated information being submitted, a respective updated comparative metric for the respective proposal of the respective active bidder that reflects the respective updated information related to the respective proposal by the respective active bidder.

14. The method of claim 13, wherein the comparative metric comprises at least one of:

a respective total project cost; and a respective detailed comparative metric other than total project cost.

15. An online competitive bidding system for performing online competitive bidding by a plurality of active bidders that bid to provide professional services to a customer, the system comprising:

at least one programmable processor to execute software;

at least one network interface to communicatively couple the system, using a communication network, to a customer client device used by the customer and a plurality of bidder client devices, each of the plurality of active bidders using a respective bidder client device;

wherein the system is coupled to at least one storage device to store information related to the online competitive bidding; and wherein the software, when executed by the programmable processor, is operable to cause the system to:

transmit to the each of the bidder client devices a respective one or more bidder pages operable to cause the respective bidder client device to display, on a respective display device, a bidder user interface for the online competitive bidding system, wherein the bidder user interface is configured to cause the respective bidder client device to receive information related to a proposal by the respective active bidder to provide the professional services to the customer;

receive, from the bidder client devices, the information related to the proposals by the active bidders to provide the professional services to the customer;

transmit to the customer client device one or more customer pages operable to cause the customer client device to display, on a respective display device, a customer user interface for the online competitive bidding system, wherein the customer user interface is configured to cause the customer client device to receive from the customer an input indicating whether the online competitive bidding system is to disclose to each of the active bidders a respective comparative metric for each of the proposals submitted by all of the other active bidders during one or more first phases of bidding and to not disclose to each of the active bidders the respective comparative metric for each of the proposals submitted by all of the other active bidders during one or more second phases of bidding, wherein the respective comparative metric for each of the proposals submitted by all of the other active bidders is a function of financial information included in the respective proposal;

receive the input indicating that the online competitive bidding system is to disclose to each of the active bidders the respective comparative metric for each of the proposals submitted by all of the other active bidders during one or more first phases of bidding and to not disclose to each of the active bidders the respective comparative metric for each of the proposals submitted by all of the other active bidders during one or more second phases of bidding; and in response to the input indicating that the online competitive bidding system is to disclose to each of the active bidders the respective comparative metric for each of the proposals submitted by all of the other active bidders during one or more first phases of bidding and to not disclose to each of the active bidders the respective comparative metric for each of the proposals submitted by all of the other active bidders during one or more second phases of bidding:

during the one or more first phases of the bidding:

determine the respective comparative metric for each of the proposals of all of the active bidders; and for each of the active bidders, transmit to the bidder client device used by that active bidder, the respective comparative metric for each of the proposals of all of the other active bidders; and wherein the bidder user interface is further operable to cause the respective bidder client device to display for the respective active bidder, on the display device associated with the respective bidder client device, the respective comparative metric for each of the proposals submitted by all of the other active bidders during the one or more first phases of the bidding and not display for the respective active bidder, on the display device associated with the respective bidder client device, the respective comparative metric for each of the proposals of all of the other active bidders during the one or more second phases of the bidding;

wherein the bidder user interface is configured to cause the respective bidder client device to receive updated information related to the proposal by the respective active bidder in response to the displaying of the respective comparative metric for each of the proposals submitted by all of the active bidders; and wherein the bidder user interface is configured to, in response to receiving the respective updated information related to the respective proposal by the respective active bidder, cause the respective bidder client device to display, on the display device associated with the respective bidder client device and with the respective active bidder and prior to the respective proposal with the respective updated information being submitted, a respective updated comparative metric for the respective proposal of the respective active bidder that reflects the respective updated information related to the respective proposal by the respective active bidder.

16. The system of claim 15, wherein the respective comparative metric comprises at least one of:

a respective total project cost; and a respective detailed comparative metric other than total project cost.

* * * * *